(12) United States Patent
Chen et al.

(10) Patent No.: US 12,413,760 B2
(45) Date of Patent: Sep. 9, 2025

(54) IMAGE CODING AND DECODING METHOD AND APPARATUS, AND STORAGE MEDIUM

(71) Applicant: Hangzhou Hikvision Digital Technology Co., Ltd., Hangzhou (CN)

(72) Inventors: Fangdong Chen, Hangzhou (CN); Dongping Pan, Hangzhou (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/726,922

(22) PCT Filed: Jan. 5, 2023

(86) PCT No.: PCT/CN2023/070621
§ 371 (c)(1),
(2) Date: Jul. 5, 2024

(87) PCT Pub. No.: WO2023/131221
PCT Pub. Date: Jul. 13, 2023

(65) Prior Publication Data
US 2025/0088651 A1    Mar. 13, 2025

(30) Foreign Application Priority Data
Jan. 7, 2022    (CN) .......................... 202210016199.1

(51) Int. Cl.
*H04N 11/02*    (2006.01)
*H04N 19/119*    (2014.01)
(Continued)

(52) U.S. Cl.
CPC ........... *H04N 19/44* (2014.11); *H04N 19/119* (2014.11); *H04N 19/176* (2014.11)

(58) Field of Classification Search
CPC ....................................................... H04N 19/44
(Continued)

(56) References Cited

U.S. PATENT DOCUMENTS

| 7,200,275 B2 | 4/2007 | Srinivasan et al. |
| 7,379,607 B2 | 5/2008 | Srinivasan et al. |

(Continued)

FOREIGN PATENT DOCUMENTS

| CN | 1605213 | 4/2005 |
| CN | 103004199 A | 3/2013 |

(Continued)

OTHER PUBLICATIONS

International Search Report in International Appln. No. PCT/CN2023/070621, mailed on Jun. 15, 2023, 12 pages (with English translation).

(Continued)

*Primary Examiner* — Leron Beck
(74) *Attorney, Agent, or Firm* — Fish & Richardson P.C.

(57) ABSTRACT

The present application discloses image coding and decoding methods and apparatuses, and a storage medium, relates to the field of image coding and decoding technologies, and helps to improve coding and decoding efficiency. An image decoding method includes: parsing a code stream to obtain a first syntax element, where the first syntax element includes an index of a target prediction mode of a to-be-decoded unit; determining the target prediction mode from an index table based on the index of the target prediction mode, where the index table includes correspondences between indexes of multiple prediction modes and the multiple prediction modes; reconstructing the to-be-decoded unit based on at least the target prediction mode to obtain a reconstructed block.

17 Claims, 11 Drawing Sheets

(51) Int. Cl.
*H04N 19/176* (2014.01)
*H04N 19/44* (2014.01)

(58) Field of Classification Search
USPC .................................. 375/240.01–240.29
See application file for complete search history.

(56) References Cited

U.S. PATENT DOCUMENTS

| | | | |
|---|---|---|---|
| 7,555,167 B2 | 6/2009 | Srinivasan et al. | |
| 8,428,374 B2 | 4/2013 | Srinivasan et al. | |
| 8,781,240 B2 | 7/2014 | Srinivasan et al. | |
| 9,088,785 B2 | 7/2015 | Srinivasan et al. | |
| 9,538,189 B2 | 1/2017 | Srinivasan et al. | |
| 9,774,852 B2 | 9/2017 | Srinivasan et al. | |
| 10,368,065 B2 | 7/2019 | Srinivasan et al. | |
| 10,506,250 B2 * | 12/2019 | Lee | H04N 19/61 |
| 10,511,859 B2 | 12/2019 | Chen et al. | |
| 10,567,753 B2 | 2/2020 | Srinivasan et al. | |
| 11,190,758 B2 | 11/2021 | Coban et al. | |
| 2003/0113026 A1 | 6/2003 | Srinivasan et al. | |
| 2004/0062445 A1* | 4/2004 | Kim | H04N 19/105 375/E7.176 |
| 2006/0262979 A1 | 11/2006 | Srinivasan et al. | |
| 2007/0110326 A1 | 5/2007 | Srinivasan et al. | |
| 2007/0253483 A1* | 11/2007 | Lee | H04N 19/176 375/E7.193 |
| 2009/0262835 A1 | 10/2009 | Srinivasan et al. | |
| 2011/0090969 A1* | 4/2011 | Sung | H04N 19/105 375/E7.027 |
| 2011/0292994 A1* | 12/2011 | Lim | H04N 19/196 375/E7.126 |
| 2012/0014441 A1* | 1/2012 | Segall | H04N 19/157 375/E7.243 |
| 2012/0275516 A1* | 11/2012 | Tanaka | H04N 19/50 375/E7.243 |
| 2013/0034154 A1* | 2/2013 | Song | H04N 19/109 375/240.03 |
| 2013/0051469 A1* | 2/2013 | Park | H04N 19/11 375/E7.243 |
| 2013/0114712 A1* | 5/2013 | Yamamoto | H04N 19/44 375/240.12 |
| 2013/0128972 A1* | 5/2013 | Yamaguchi | H04N 19/61 375/240.12 |
| 2013/0235932 A1 | 9/2013 | Srinivasan et al. | |
| 2013/0301720 A1* | 11/2013 | Lee | H04N 19/182 375/240.12 |
| 2014/0192862 A1 | 7/2014 | Flynn et al. | |
| 2014/0219349 A1* | 8/2014 | Chien | H04N 19/105 375/240.12 |
| 2014/0286420 A1 | 9/2014 | Srinivasan et al. | |
| 2014/0334551 A1* | 11/2014 | Kim | H04N 19/52 375/240.16 |
| 2015/0288962 A1 | 10/2015 | Srinivasan et al. | |
| 2015/0312568 A1* | 10/2015 | Lainema | H04N 19/593 375/240.02 |
| 2016/0150243 A1* | 5/2016 | Shima | H04N 19/182 375/240.12 |
| 2017/0078658 A1 | 3/2017 | Srinivasan et al. | |
| 2017/0230687 A1 | 8/2017 | Chen et al. | |
| 2017/0374362 A1 | 12/2017 | Srinivasan et al. | |
| 2018/0324418 A1 | 11/2018 | Koo et al. | |
| 2019/0238832 A1 | 8/2019 | Jun et al. | |
| 2019/0327464 A1 | 10/2019 | Srinivasan et al. | |
| 2020/0275111 A1* | 8/2020 | Zhao | H04N 19/46 |
| 2020/0280742 A1* | 9/2020 | Ramasubramonian | H04N 19/189 |
| 2020/0314432 A1* | 10/2020 | Wang | H04N 19/147 |
| 2020/0344469 A1 | 10/2020 | Coban et al. | |
| 2021/0160508 A1 | 5/2021 | Lim et al. | |
| 2022/0007018 A1 | 1/2022 | Francois et al. | |
| 2022/0108480 A1* | 4/2022 | Liu | G06T 9/00 |

FOREIGN PATENT DOCUMENTS

| | | |
|---|---|---|
| CN | 105791819 A | 7/2016 |
| CN | 105939479 A | 9/2016 |
| CN | 107040785 | 8/2017 |
| CN | 110365976 A | 10/2019 |
| CN | 110662033 | 1/2020 |
| CN | 111698504 | 9/2020 |
| CN | 113475068 | 10/2021 |
| CN | 113711595 | 11/2021 |
| CN | 116074500 | 11/2021 |
| JP | 2015-005903 A | 1/2015 |
| JP | 2017-527194 A | 9/2017 |
| JP | 2019-528621 A | 10/2019 |
| TW | 201740728 | 11/2017 |
| TW | 202327356 | 7/2023 |
| WO | WO 2018003008 A1 | 1/2018 |
| WO | WO 2020176634 A1 | 9/2020 |

OTHER PUBLICATIONS

Notice of Allowance in Chinese Appln. No. 202210016199.1, mailed on Sep. 6, 2024, 8 pages (with English translation).
Bross et al., "Versatile Video Coding (Draft 5)," Paper, Presented at the 14th Meeting: Joint Video Experts Team (JVET) of ITU-T SG 16 WP 3 and ISO/IEC JTC 1/SC 29/WG 11, Geneva, CH, Mar. 19-27, 2019; MPEG, Mar. 19-27, 2019, JVET-N1001-v10, 408 pages.
Office Action in Japanese Appln. No. 2024-541071, mailed on Jul. 8, 2025, 8 pages (with machine translation).

* cited by examiner

A prediction mode of at least one prediction group into which a current image block is divided is determined. Any one of the at least one prediction group includes a plurality of consecutive pixels located in a same row; the any one prediction group includes a first specified pixel region and a second specified pixel region, where the first specified pixel region includes a plurality of pixel groups, the plurality of pixel groups are obtained by dividing according to the second specified pixel region, and prediction manners of the first specified pixel region and the second specified pixel region are different. The plurality of pixel groups may be predicted in parallel, and one pixel group includes one or more consecutive pixels. — S701

The current image block is reconstructed based on the prediction mode of the at least one prediction group to obtain a reconstructed block — S702

FIG. 10

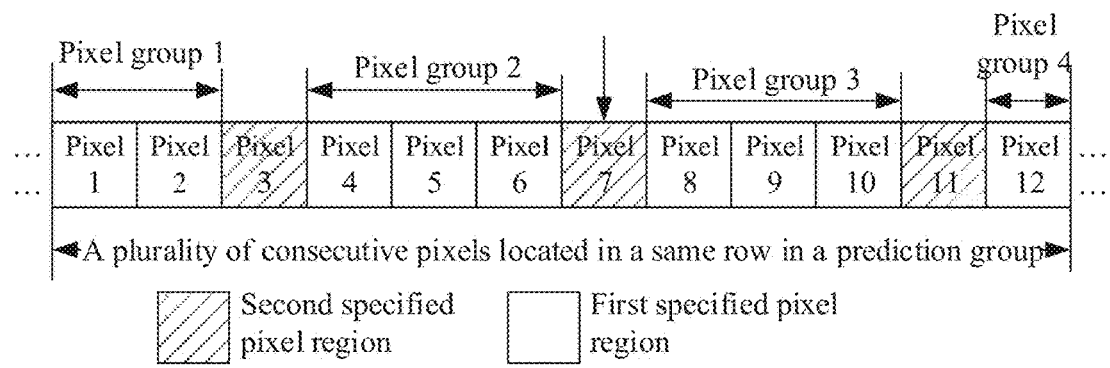

FIG. 11

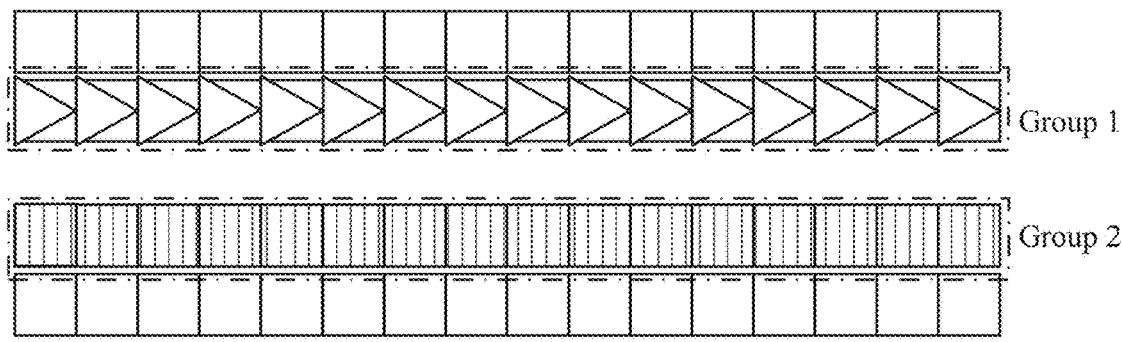

FIG. 12

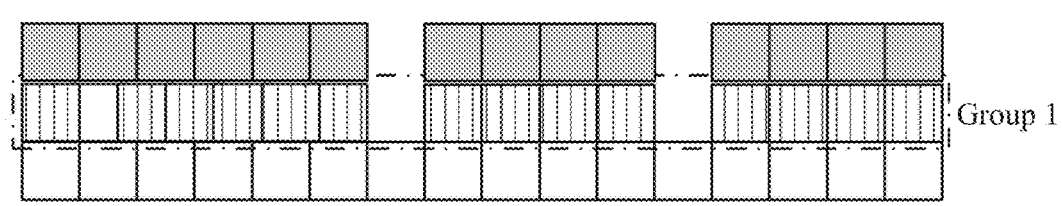

FIG. 13A

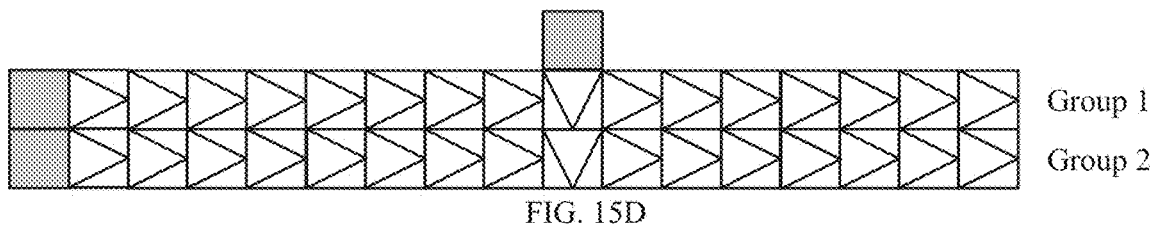
FIG. 15D
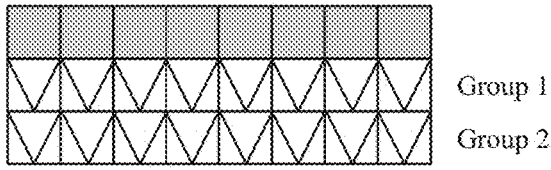
FIG. 16A
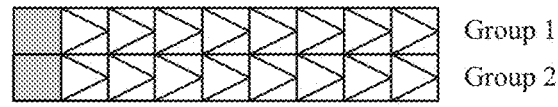
FIG. 16B
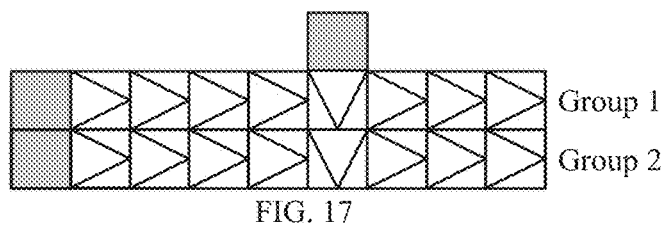
FIG. 17
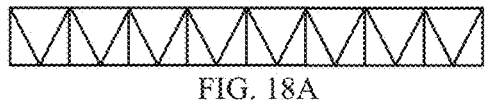
FIG. 18A
FIG. 18B
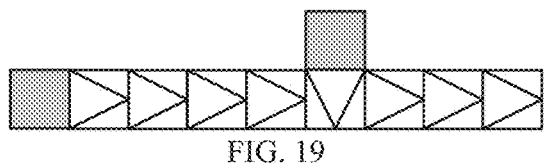
FIG. 19
a: Index is coded as 0
b: Index is coded as 100
c: Index is coded as 101
d: Index is coded as 110
e: Index is coded as 111
FIG. 20

IMAGE CODING AND DECODING METHOD AND APPARATUS, AND STORAGE MEDIUM

CROSS-REFERENCE TO RELATED APPLICATIONS

This application is a national stage of international PCT Application No. PCT/CN2023/070621 filed on Jan. 5, 2023 and claims priority to Application No. CN 202210016199.1, filed on Jan. 7, 2022, the entire contents of which are incorporated herein by reference.

TECHNICAL FIELD

The present application relates to the field of image coding and decoding technologies, and in particular, to image coding and decoding methods and apparatuses and storage media.

BACKGROUND

A complete image in a video is usually referred to as a "frame", and a video composed of a plurality of frames in a chronological order is referred to as a video sequence. The video sequence has various types of redundancy information such as space redundancy, time redundancy, vision redundancy, information entropy redundancy, structure redundancy, knowledge redundancy, and importance redundancy. In order to remove the redundancy information from the video sequence as much as possible and reduce the amount of data representing the video, a video coding technology is proposed to achieve effects on reducing storage space and saving transmission bandwidth. The video coding technology may be referred to as a video compression technology.

With the continuous development of technology, collecting video data is more and more convenient, and a scale of the collected video data is also increasing. Therefore, how to effectively code and decode video data has become an urgent problem to be solved.

SUMMARY

The present application provides image coding and decoding methods and apparatuses and storage media for effectively coding and decoding video data, so as to improve coding and decoding efficiency. In order to achieve this objective, the present application adopts the following technical solutions.

In a first aspect, there is provided an image decoding method, including: parsing a code stream to obtain a first syntax element, where the first syntax element includes an index of a target prediction mode of a to-be-decoded unit; determining the target prediction mode from an index table based on the index of the target prediction mode, where the index table includes correspondences between indexes of multiple prediction modes and the multiple prediction modes; reconstructing the to-be-decoded unit based on at least the target prediction mode to obtain a reconstructed block. In this technical solution, the target prediction mode may be determined from the index table directly based on the index of the target prediction mode, and a flag bit org_flag does not need to be parsed, reducing decoding complexity of the decoding side, and further improving decoding efficiency.

In a possible implementation manner, the indexes of the multiple prediction modes are generated in a truncated unary coding manner. This helps to further reduce code stream transmission overhead.

In a possible implementation manner, the indexes of the multiple prediction modes are generated in a binary tree manner.

In a possible implementation manner, the multiple prediction modes include an original value mode and other prediction modes; and a code word length of an index of the original value mode is greater than or equal to a code word length of an index of one or more of the other prediction modes. Since usage frequencies of some other prediction modes are higher than a usage frequency of the original value mode, code word lengths of indexes of other prediction modes are set to be shorter, which helps to further reduce code stream transmission overhead.

In a possible implementation manner, other prediction modes include at least one of: a point prediction mode, an intra-frame prediction mode, or a block copy mode.

In a possible implementation manner, the multiple prediction modes include original value mode, a point prediction mode, an intra-frame prediction mode and an intra-frame block copy mode; in a case where the indexes of the multiple prediction modes are generated in a binary tree manner, index generation rules of the multiple prediction modes include: using 1 as the highest flag bit for indexes for the original value mode and the intra-frame prediction mode; using 1, 011, 010, 0011, 0010, 00001, 00000 respectively as remaining flag bits for different intra-frame prediction modes; and using 0001 as remaining flag bits for the original value mode.

In a possible implementation manner, the code stream is parsed to further obtain a second syntax element, where the second syntax element includes an index of a residual coding mode of the to-be-decoded unit. Correspondingly, reconstructing the to-be-decoded unit based on at least the target prediction mode to obtain the reconstructed block includes: if the index of the residual coding mode indicates a skip residual coding mode, predicting the to-be-decoded unit to obtain a predicted block, and determining the predicted block of the to-be-decoded unit as the reconstructed block of the to-be-decoded unit; if the index of the residual coding mode indicates a normal residual coding mode, parsing a residual quantization related value of the to-be-decoded unit to obtain a residual block, and reconstructing the to-be-decoded unit based on the target prediction mode and the residual block of the to-be-decoded unit to obtain the reconstructed block.

In a possible implementation manner, other prediction modes include at least one of: a point prediction mode based on normal residual coding, an intra-frame prediction mode based on normal residual coding, a block copy mode based on normal residual coding, a point prediction mode based on skip residual coding, an intra-frame prediction mode based on skip residual coding, or a block copy mode based on skip residual coding. In some examples, other prediction modes include at least one of: a point prediction mode based on normal residual coding, an intra-frame prediction mode based on normal residual coding, a block copy mode based on normal residual coding.

In a possible implementation manner, reconstructing the to-be-decoded unit based on at least the target prediction mode to obtain the reconstructed block includes: if the target prediction mode is the point prediction mode based on skip residual coding, the intra-frame prediction mode based on skip residual coding, or the block copy mode based on skip residual coding, determining a predicted block of the to-be-decoded unit as the reconstructed block of the to-be-decoded unit; if the target prediction mode is the point prediction mode based on normal residual coding, the intra-frame prediction mode based on normal residual coding, or the block copy mode based on normal residual coding, parsing a residual quantization related value of the to-be-decoded unit to obtain a residual block of the to-be-decoded unit, and reconstructing the to-be-decoded unit based on the target prediction mode and the residual block of the to-be-decoded unit to obtain the reconstructed block of the to-be-decoded unit. In some examples, reconstructing the to-be-decoded unit based on at least the target prediction mode to obtain the reconstructed block includes: if the target prediction mode is the point prediction mode based on normal residual coding, the intra-frame prediction mode based on normal residual coding, or the block copy mode based on normal residual coding, parsing a residual quantization related value of the to-be-decoded unit to obtain a residual block of the to-be-decoded unit, and reconstructing the to-be-decoded unit based on the target prediction mode and the residual block of the to-be-decoded unit to obtain the reconstructed block of the to-be-decoded unit.

In a possible implementation manner, each row of pixels in the to-be-decoded unit are used as one prediction group, and a residual block in the prediction group is divided into at least one residual sub-block.

In a possible implementation manner, the residual block in the prediction group is divided into a plurality of residual sub-blocks by: dividing, according to a ratio of 1:1, the residual block in the prediction group into 2 residual sub-blocks; or dividing, according to a ratio of 2:1:1, the residual block in the prediction group into 3 residual sub-blocks; or dividing, according to a ratio of 1:1:2, the residual block in the prediction group into 3 residual sub-blocks; or dividing, according to a ratio of 1:1:1:1, the residual block in the prediction group into 4 residual sub-blocks.

In a possible implementation manner, the to-be-decoded unit includes at least one prediction group; any one of the at least one prediction group includes a plurality of consecutive pixels located in a same row/column; the any one prediction group includes a first specified pixel region and a second specified pixel region, where the first specified pixel region includes a plurality of pixel groups, the plurality of pixel groups are obtained by dividing according to the second specified pixel region, prediction manners of the first specified pixel region and the second specified pixel region are different, the plurality of pixel groups can be predicted in parallel, and the pixel groups each include one or more consecutive pixels.

In a possible implementation manner, if the any one prediction group includes the plurality of consecutive pixels located in a same row, vertical prediction is used in the first specified pixel region, and horizontal prediction or vertical mean prediction is used in the second specified pixel region; and/or In a possible implementation manner, if the any one prediction group includes the plurality of consecutive pixels located in a same column, horizontal prediction is used in the first specified pixel region, and vertical prediction or horizontal mean prediction is used in the second specified pixel region.

In a possible implementation manner, differences among numbers of pixels included in different pixel groups are equal to or less than a threshold.

In a possible implementation manner, if there is no reference block in the to-be-decoded unit, a reconstruction value of a first pixel of the to-be-decoded unit is a value obtained after a bit width of the to-be-decoded unit shifts left by 1 bit.

In a possible implementation manner, the to-be-decoded unit includes at least one prediction group; any one of the at least one prediction group includes a plurality of consecutive pixels; reconstructing the to-be-decoded unit based on at least the target prediction mode to obtain the reconstructed block includes: when the target prediction mode meets a predetermined condition, determining a reconstruction value of a target pixel based on a reference value of a first pixel in the plurality of consecutive pixels and residual values of every two adjacent pixels between the first pixel and the target pixel, where the target pixel is any one of non-first pixels in the plurality of consecutive pixels, and the reconstructed block of the to-be-decoded unit includes the reconstruction value of the target pixel.

In a possible implementation manner, a first prediction manner is used for the first pixel, and a second prediction manner is used for the non-first pixels; the target prediction mode includes the first prediction manner and the second prediction manner, and the predetermined condition that the target prediction mode meets includes: both the first prediction manner and the second prediction manner are horizontal prediction; or both the first prediction manner and the second prediction manner are vertical prediction; or one of the first prediction manner and the second prediction manner is horizontal prediction, and another one of the first prediction manner and the second prediction manner is vertical prediction; or the first prediction manner is a manner in which reference prediction is performed by using a pixel value of a decoded unit adjacent to the to-be-decoded unit or a pixel value of an independent decoded unit adjacent to an independent decoded unit in which the to-be-decoded unit is located, and the second prediction manner is horizontal prediction or vertical prediction.

In a second aspect, there is provided an image coding method, including: determining a target prediction mode of a to-be-coded unit; determining an index of the target prediction mode from an index table based on the target prediction mode, where the index table includes correspondences between indexes of multiple prediction modes and the multiple prediction modes; coding the index of the target prediction mode into a code stream. In this technical solution, the index of the target prediction mode is determined from the index table directly based on the target prediction mode, and an index (for example, a flag bit org_flag) of whether the target prediction mode is the original value mode does not need to be coded into the code stream. Because, in most cases, the original value mode is not used, for example, a point prediction mode or an intra-frame prediction mode is usually used, the flag bit (org_flag) representing whether the original value mode is used does not need to be coded, which helps to save code stream transmission overhead and further improves coding efficiency.

In a possible implementation manner, the indexes of the multiple prediction modes are generated in a truncated unary coding manner.

In a possible implementation manner, the indexes of the multiple prediction modes are generated in a binary tree manner.

In a possible implementation manner, the multiple prediction modes include an original value mode and other prediction modes; and a code word length of an index of the original value mode is greater than or equal to a code word length of an index of one or more of the other prediction modes.

In a possible implementation manner, other prediction modes include at least one of: a point prediction mode, an intra-frame prediction mode, or a block copy mode.

In a possible implementation manner, other prediction modes include at least one of: a point prediction mode based on normal residual coding, an intra-frame prediction mode based on normal residual coding, a block copy mode based on normal residual coding, a point prediction mode based on skip residual coding, an intra-frame prediction mode based on skip residual coding, or a block copy mode based on skip residual coding.

In a third aspect, there is provided an image reconstruction method, which may be applied to an image coding method or an image decoding method. The image reconstruction method includes: determining a residual coding mode of a current image block; if the residual coding mode is a skip residual coding mode, predicting the current image block to obtain a predicted block, and determining the predicted block as a reconstructed block of the current image block; if the residual coding mode is a normal residual coding mode, acquiring a residual quantization related value of the current image block to obtain a residual block, and reconstructing the current image block based on the residual block to obtain a reconstructed block of the current image block.

In this technical solution, the residual coding mode is first determined, then, when the residual coding mode is the normal residual coding mode, the residual quantization related value of the current image block is acquired, and when the residual coding mode is the skip residual coding mode, the residual quantization related value of the current image block does not need to be acquired. In this way, in a case where the residual coding mode is the normal residual coding mode, the coding side does not need to code the residual quantization related value of the current image block into the code stream, and the decoding side does not need to parse the residual quantization related value of the current image block, which helps to save code stream transmission overhead and further improve coding efficiency; and helps to reduce decoding complexity and further improve decoding efficiency.

In a fourth aspect, there is provided an image reconstruction method, which may be applied to an image coding method or an image decoding method. The image reconstruction method includes: determining a target prediction mode of a current image block; if the target prediction mode is a prediction mode based on skip residual coding, predicting the current image block to obtain a predicted block, and determining the predicted block as a reconstructed block; if the target prediction mode is a prediction mode based on normal residual coding, acquiring a residual quantization related value of the current image block to obtain a residual block of the current image block, and reconstructing the current image block based on the target prediction mode and the residual block to obtain a reconstructed block.

In this technical solution, conventional residual coding mode and prediction mode are combined into a new prediction mode provided in the examples of the present application, where the residual coding mode and the prediction mode do not need to be respectively coded (decoded), and only the new prediction mode needs to be uniformly coded (decoded), of which implementation logic is simple, helping to save code stream transmission overhead. In addition, the coding side (the decoding side) may first code (decode) information on the residual coding mode (such as an index of the residual coding mode, for example, res_skip_flag), and then determine whether the residual quantization related value (for example, a near value or a QP value) is coded (or decoded) based on the residual coding mode, so that, when the residual coding mode is the skip residual coding mode, the residual quantization related value does not need to be coded (or decoded), which helps to save code stream transmission overhead.

In a possible implementation manner, the prediction mode based on skip residual coding includes: a point prediction mode based on skip residual coding, an intra-frame prediction mode based on skip residual coding, or a block copy mode based on skip residual coding.

In a possible implementation manner, the prediction mode based on normal residual coding includes: a point prediction mode, an intra-frame prediction mode, or a block copy mode based on normal residual coding.

In a fifth aspect, there is provided an image reconstruction method, which may be applied to an image coding method or an image decoding method. The image reconstruction method includes: determining a prediction mode of at least one prediction group into which a current image block is divided, where any one of the at least one prediction group includes a plurality of consecutive pixels located in a same row/column, the any one prediction group includes a first specified pixel region and a second specified pixel region, the first specified pixel region includes a plurality of pixel groups, the plurality of pixel groups are obtained by dividing according to the second specified pixel region, prediction manners of the first specified pixel region and the second specified pixel region are different, the plurality of pixel groups can be predicted in parallel, and the pixel groups each include one or more consecutive pixels; and reconstructing the current image block based on the prediction mode of the at least one prediction group to obtain a reconstructed block. In this technical solution, a plurality of pixel groups in one prediction group may be predicted in parallel, which helps to shorten time consumption of prediction for the prediction group.

In a possible implementation manner, if the any one prediction group includes a plurality of consecutive pixels located in a same row, vertical prediction is used in the first specified pixel region, and horizontal prediction or vertical mean prediction is used in the second specified pixel region.

In a possible implementation manner, if the any one prediction groups includes a plurality of consecutive pixels located in a same column, horizontal prediction is used in the first specified pixel region, and vertical prediction or horizontal mean prediction is used in the second specified pixel region.

In a possible implementation manner, differences among numbers of pixels included in different pixel groups are equal to or less than a threshold.

In a possible implementation manner, if there is no reference block in the current image block, a reconstruction value of a first pixel in the current image block is a value obtained after a bit width of the current image block shifts left by 1 bit.

In a possible implementation manner, the current image block comprises at least one prediction group, and any one of the at least one prediction group comprises a plurality of consecutive pixels; and reconstructing the current image block based on the prediction mode of the at least one prediction group to obtain the reconstructed block comprises: when a target prediction mode satisfies a predetermined condition, determining a reconstruction value of a target pixel based on a reference value of a first pixel in the plurality of consecutive pixels and residual values of every two adjacent pixels between the first pixel and the target pixel, wherein the target pixel is any one of non-first pixels in the plurality of consecutive pixels, and a reconstructed block of the current image block comprises the reconstruction value of the target pixel.

In a sixth aspect, there is provided an image reconstruction method, which may be applied to an image coding method or an image decoding method. The image reconstruction method includes: determining a target prediction mode of a current image block, where the current image block includes at least one prediction group, and any one of the at least one prediction group includes a plurality of consecutive pixels; and when the target prediction mode meets a predetermined condition, determining a reconstruction value of a target pixel based on a reference value of a first pixel in the plurality of consecutive pixels and residual values of every two adjacent pixels between the first pixel and the target pixel, where the target pixel is any one of non-first pixels in the plurality of consecutive pixels, and a reconstructed block of the current image block includes the reconstruction value of the target pixel.

In this technical solution, the coding side/the decoding side, when performing reconstruction, may obtain a reconstruction value of a current pixel directly based on residual values of its previous pixel and its adjacent pixel, without waiting to obtain a reconstruction value of its previous pixel. This solution can greatly improve parallelism in a reconstruction process, and thereby increase decoding parallelism and throughput.

In a possible implementation manner, a first prediction manner is used for the first pixel, and a second prediction manner is used for the non-first pixels; the target prediction mode includes the first prediction manner and the second prediction manner, and the predetermined condition that the target prediction mode meets includes: both the first prediction manner and the second prediction manner are horizontal prediction; or both the first prediction manner and the second prediction manner are vertical prediction; or one of the first prediction manner and the second prediction manner is horizontal prediction, and another one of the first prediction manner and the second prediction manner is vertical prediction; or the first prediction manner is a manner in which reference prediction is performed by using a pixel value of a decoding unit adjacent to the current image block or a pixel value of an independent decoding unit adjacent to an independent decoding unit in which the current image block is located, and the second prediction mode is horizontal prediction or vertical prediction.

In a seventh aspect, there is provided an image decoding apparatus, which may be a video decoder or a device including the video decoder. The decoding apparatus include various modules for implementing the method in any one of the possible implementation manners in the first, third, fourth or fifth aspects. The decoding apparatus has functions of implementing behaviors in the above relevant method examples. The functions may be realized by hardware or by hardware executing corresponding software. The hardware or software includes one or more modules corresponding to the functions. For beneficial effects, reference may be made to the description in corresponding methods, which will not be described herein again.

In an eighth aspect, there is provided an image coding apparatus, which may be a video coder or a device including the video coder. The coding apparatus include various modules for implementing the method in any one of the possible implementation manners in the second, third, fourth or fifth aspects. The coding apparatus has functions of implementing behaviors in the above relevant method examples. The functions may be realized by hardware or by hardware executing corresponding software. The hardware or software includes one or more modules corresponding to the functions. For beneficial effects, reference may be made to the description in corresponding methods, which will not be described herein again.

In a ninth aspect, the present application provides an electronic device, including: a processor and a memory, where the memory is configured to store computer instructions, and the processor is configured to call the computer instructions from the memory and run the computer instructions to implement the method in any one of the implementation manners in the first to sixth aspects. For example, the electronic device may refer to a video coder, or a device including the video coder. For another example, the electronic device may refer to a video decoder, or a device including the video decoder.

In a tenth aspect, the present application provides a computer readable storage medium, where the storage medium stores computer programs or instructions, and the computer programs or instructions are executed by a computing device or a storage system where the computing device is located to implement the method in any one of the implementation manners in the first to sixth aspects.

In an eleventh aspect, the present application provides a computer program product, including instructions, where, when the computer program product is running on a computing device or a processor, the computing device or the processor is caused to execute the instructions to implement the method in any one of the implementation manners in the first to sixth aspects.

In a twelfth aspect, the present application provides a chip, including: a memory and a processor, where the memory is configured to store computer instructions, and the processor is configured to call the computer instructions from the memory and run the computer instructions to implement the method in any one of the implementation manners in the first to sixth aspects.

In a thirteenth aspect, the present application provides an image decoding system, including a coding side and a decoding side, where the decoding side is configured to implement the corresponding decoding method provided in the first to sixth aspects, and the coding side is configured to implement the coding method corresponding thereto.

In the present application, on the basis of the implementation manners provided in the above aspects, the implementations may be further combined to provide more implementation manners. Or, any one of the possible implementation manners in any one of the above aspects may be applied to other aspect without conflict to obtain new examples. For example, any one of the image reconstruction methods provided in the third to fifth aspects may be applied to any one of the coding or decoding methods provided in the first or second aspects. For example, any two of the reconstruction methods provided in the third to fifth aspects may be combined without conflict to obtain new reconstruction methods.

BRIEF DESCRIPTION OF DRAWINGS

FIG. 10 is a first schematic flowchart showing an image reconstruction method according to an example of the present application FIG. 11 a schematic diagram showing a manner of dividing parallel pixel groups according to an example of the present application.

FIG. 12 is a first schematic diagram showing a prediction division mode of a current image block of 16×2.

FIGS. 13A-13B are schematic diagrams showing a prediction division mode of a current image block of 16×2 corresponding to that in FIG. 12 according to examples of the present application.

FIGS. 15A-15D are schematic diagrams showing a prediction division mode of a current image block of 16×2 corresponding to that in FIG. 14 according to examples of the present application.

FIGS. 16A and 16B are schematic diagrams showing a prediction division mode of a current image block of 8×2.

FIG. 17 is a schematic diagram showing a prediction division mode of a current image block of 8×2 corresponding to that in FIGS. 16A and 16B according to an example of the present application.

FIGS. 18A and 18B are schematic diagrams showing a prediction division mode of a current image block of 8×1.

FIG. 19 is a schematic diagram showing a prediction division mode of a current image block of 8×1 corresponding to that in FIGS. 18A and 18B according to an example of the present application.

FIG. 20 is a schematic diagram showing residual block grouping of a current image block of 8×1 according to an example of the present application.

DETAILED DESCRIPTION

Figure 1:
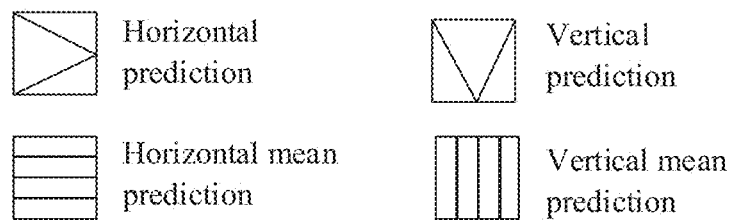
FIG. 1 is a schematic diagram showing multiple prediction manners according to an example of the present application.

First, technical terms involved in the examples of the present application will be introduced.

1) Prediction Mode

A combination of prediction manners used to predict a current image block (for example, a to-be-coded unit/a to-be-decoded unit) is referred to as a prediction mode. Different pixels in the current image block may be predicted in different prediction manners or in a same prediction manner, and prediction manners used to predict all pixels in the current image block may be collectively referred to as a prediction mode of (or corresponding to) the current image block.

Prediction modes may include a point prediction mode, an intra-frame prediction mode, a block copy mode, an original value mode (that is, a reconstruction value mode in which a fixed bit width is directly decoded), and the like.

For example, in the point prediction mode, a prediction value is determined based on a pixel reconstruction value of a surrounding adjacent point. The point prediction mode includes a combination of one or more of prediction manners such as vertical prediction, horizontal prediction, vertical mean prediction, and horizontal mean prediction. In the vertical prediction, a prediction value of a current pixel is obtained by using a pixel value on an upper side of the current pixel (which may be an adjacent upper side or a non-adjacent but closer upper side). In an example, a reconstruction value of an adjacent pixel on the upper side of the current pixel is used as the prediction value of the current pixel. In the horizontal prediction, the prediction value of the current pixel is obtained by using a pixel value on a left side of the current pixel (which may be an adjacent left side or a non-adjacent but closer left side). In an example, a reconstruction value of an adjacent pixel on the left side of the current pixel is used as the prediction value of the current pixel. In the vertical mean prediction, the prediction value of the current pixel is obtained by using pixel values above and below the current pixel. In an example, the prediction value of the current pixel is a mean of a reconstruction value of an adjacent pixel vertically above the current pixel and a reconstruction value of an adjacent pixel vertically below the current pixel. In the horizontal mean prediction, the prediction value of the current pixel is obtained by using pixel values on left and right sides of the current pixel. In an example, the prediction value of the current pixel is a mean of a reconstruction value of an adjacent pixel horizontally on the left side of the current pixel and a reconstruction value of an adjacent pixel horizontally on the right side of the current pixel.

For example, in the intra-frame prediction mode, a prediction value is determined based on a pixel reconstruction value of a surrounding adjacent block.

For example, in the block copy prediction mode, a prediction value is determined based on a pixel reconstruction value of a surrounding coded (decoded) block (not necessarily adjacent).

For example, the original value mode is a reconstruction value mode in which a fixed bit width is directly decoded, that is, a no-reference prediction mode.

FIG. 1 is a schematic diagram showing multiple prediction manners according to an example of the present application. One small square in FIG. 1 represents one pixel. Pixels including different signs are used to represent different prediction manners, specifically showing vertical prediction, horizontal prediction, vertical mean prediction, and horizontal mean prediction. The schematic diagram of the prediction manners shown in FIG. 1 may be used to explain any related accompanying drawing involved in the present application, for example, FIG. 12.

2) Residual Coding Mode

A manner of coding a residual (that is, a residual block composed of a residual value of each pixel in a current image block) of the current image block (for example, a to-be-coded unit/a to-be-decoded unit) is referred to as a residual coding mode. The residual coding mode may include a skip residual coding mode and a normal residual coding mode.

In the skip residual coding mode, residual coefficients do not need to be coded (decoded), in this case, all residual values of pixels in the current image block are 0, and a reconstruction value of each pixel is equal to a prediction value of the pixel.

In the normal residual coding mode, the residual coefficients need to be coded (decoded), in this case, not all residual values of pixels in a current image block are 0, and the reconstruction value of each pixel may be obtained based on the prediction value and a residual value of the pixel.

In an example, a residual value of a pixel is equal to a residual coefficient of the pixel.

In another example, a residual coefficient of a pixel may be obtained by processing a residual value of the pixel.

3) Other Terms

The term "at least one" in the examples of the present application includes one or more. "Multiple" or "plurality of" means two or more. For example, at least one of A, B or C includes that: A exists alone, B exists alone, C exists alone, A and B exist simultaneously, A and C exist simultaneously, B and C exist simultaneously, as well as A, B and C exist simultaneously. In the description of this application, unless otherwise specified, "/" indicates "or", for example, A/B may indicate A or B. "And/or" herein is merely an association relationship of describing associated objects, indicating that there may exist three relationships, for example, A and/or B, which may indicate three cases: A exists alone, A and B exist simultaneously, and B exists alone. "Multiple" or "plurality of" means two or more. In addition, in order to clearly describe the technical solutions in the examples of the present application, words such as "first" and "second" are used in the examples of the application to distinguish between same or similar items with substantially same functions and roles. Those skilled in the art may understand that the words such as "first" and "second" limit neither a quantity and an execution order nor a definite difference.

A system architecture to which the examples of the present application are applied will be described below.

Figure 2:
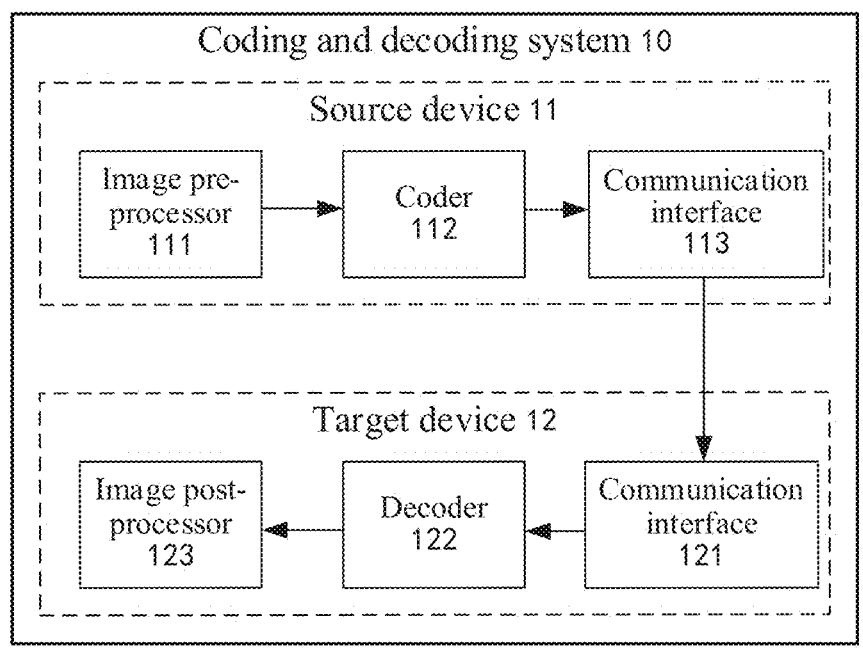
FIG. 2 is a schematic diagram showing an architecture of a coding and decoding system to which the examples of the present application are applied.

FIG. 2 is a schematic diagram showing an architecture of a coding and decoding system 10 to which the examples of the present application are applied. As shown in FIG. 2, the coding and decoding system 10 may include a source device 11 and a target device 12. The source device 11 is configured to code an image, and therefore, the source device 11 may be referred to as an image coding apparatus or a video coding apparatus. The target device 12 is configured to decode coded image data generated by the source device 11, and therefore, the target device 12 may be referred to as an image decoding apparatus or a video decoding apparatus.

The source device 11 and the target device 12 may include various apparatuses, including desktop computers, mobile computing apparatuses, notebook (for example, laptop) computers, tablet computers, set-top boxes, telephone handsets such as so-called "smart" phones, televisions, cameras, display devices, digital media players, video game consoles, in-vehicle computers, or the like. In some examples, the source device 11 and the target device 12 in FIG. 2 may be two separate devices, or the source device 11 and the target device 12 are same devices, that is, the source device 11 or corresponding functions and the target device 12 or corresponding functions may be integrated on a same device. The source device 11 and the target device 12 may communicate therebetween, for example, the target device 12 may receive the coded image data from the source device 11. In an example, one or more communication media may be included between the source device 11 and the target device 12, and the coded image data is transmitted through the one or more communication media, where the one or more communication media may include routers, switches, base stations, or other devices that facilitate communication from the source device 11 to the target device 12.

As shown in FIG. 2, the source device 11 includes a coder 112. In some examples, the source device 11 may further include an image pre-processor 111 and a communication interface 113. The image pre-processor 111 is configured to pre-process a received to-be-coded image, for example, pre-processing performed by the image pre-processor 111 may include trimming, color format conversion (for example, conversion from an RGB format to a YUV format), toning, denoising, or the like. The coder 112 is configured to receive the pre-processed image, and process the pre-processed image by using a related prediction mode, so as to provide the coded image data. In some examples, the coder 112 may be configured to perform coding processes in various examples described below. The communication interface 113 may be configured to transmit the coded image data to the target device 12 or any other device configured to decode or store (for example, a memory) for storage or direct reconstruction. The communication interface 113 may encapsulate the coded image data in a suitable format and then transmit the encapsulated image data.

In some examples, the image pre-processor 111, the coder 112, and the communication interface 113 may be hardware components or software programs in the source device 11, which is not limited in the examples of the present application.

Continuously, as shown in FIG. 2, the target device 12 includes a decoder 122. In some examples, the target device 12 may further include a communication interface 121 and an image post-processor 123. The communication interface 121 may be configured to receive the coded image data from the source device 11 or any other source device, where the any other source device is, for example, a storage device. The communication interface 121 may decapsulate the data transmitted from the communication interface 113 to acquire the coded image data. The decoder 122 is configured to receive the coded image data and output decoded image data (which may be referred to as reconstructed image data). In some examples, the decoder 122 may be configured to perform decoding processes in various examples described below.

The image post-processor 123 is configured to post-process the decoded image data to obtain the post-processed image data. Post-processing performed by the image post-processor 123 may include color format conversion (for example, conversion from a YUV format to an RGB format), toning, trimming, re-sampling, or any other processing. The image post-processor 123 may be further configured to transmit the post-processed image data to a display device for display.

Similarly, in some examples, the communication interface 121, the decoder 122, and the image post-processor 123 may be hardware components or software programs in the target device 12, which is not limited in the examples of the present application.

Structures of the coder and the decoder in FIG. 2 will be introduced briefly below.

Figure 3:
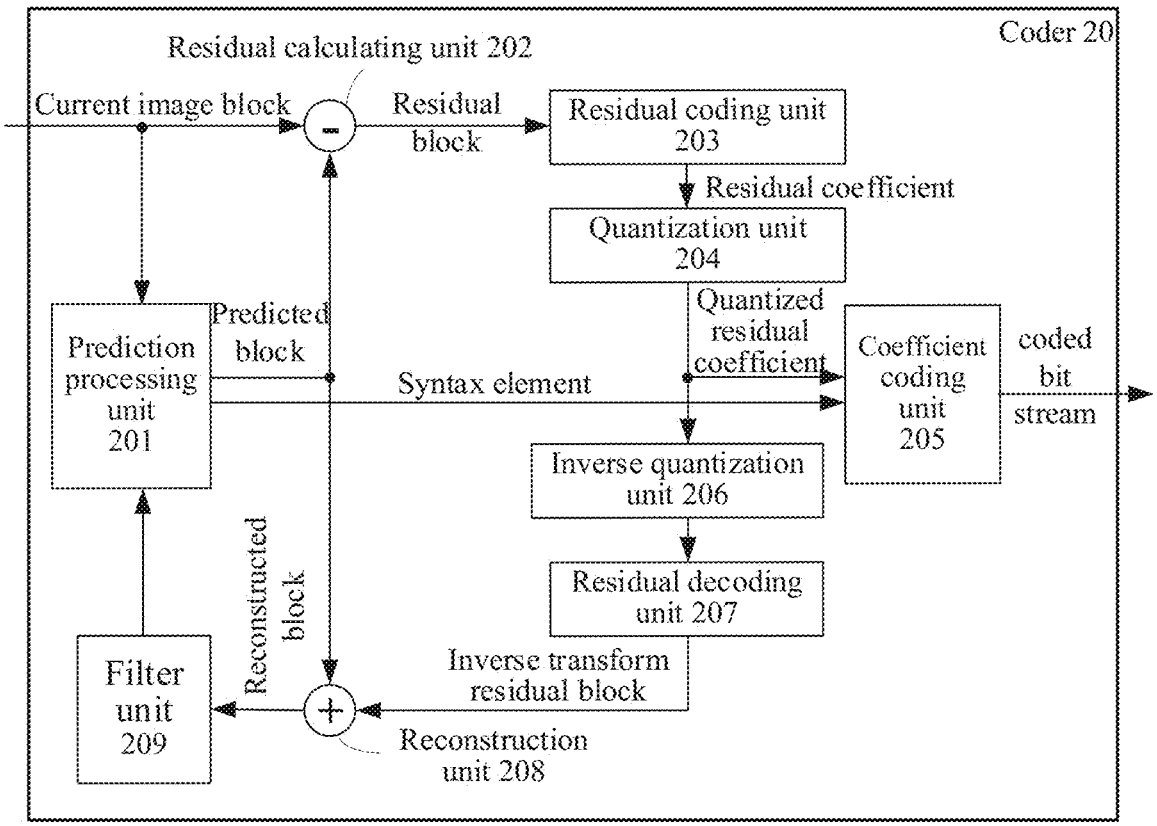
FIG. 3 is a schematic block diagram showing an example of a coder for implementing an example of the present application.

FIG. 3 is a schematic block diagram showing an example of a coder 20 for implementing an example of the present application. In FIG. 3, the coder 20 includes a prediction processing unit 201, a residual calculating unit 202, a residual coding unit 203, a quantization unit 204, a coefficient coding unit 205, an inverse quantization unit 206, a residual decoding unit 207, a reconstruction unit 208, and a filter unit 209. In some examples, the coder 20 may further include a buffer and a decoded image buffer. The buffer is configured to buffer a reconstructed image block output from the reconstruction unit 208, and the decoded image buffer is configured to buffer a filtered image block output from the filter unit 209.

In an example, the input of the coder 20 is an image block of a to-be-coded image (that is, a current image block or a to-be-coded image block) or a coding unit. In another example, the input of the coder 20 is a to-be-coded image, and the coder 20 may include a division unit (not shown in FIG. 3), where the division unit is configured to divide the to-be-coded image into a plurality of image blocks. The coder 20 is configured to perform block-by-block coding to complete coding of the to-be-coded image, for example, perform a coding process on each image block.

In an example, a method for dividing a to-be-coded image into a plurality of image blocks may include the following steps.

At step 1, a frame image is divided into one or more parallel coding units that do not overlap each other, and the parallel coding units have no dependency relationship therebetween, so that parallel/independent coding and decoding can be performed.

At step 2, for each parallel coding unit, a coding side may divide the parallel coding unit into one or more independent coding units that do not overlap each other, and the independent coding units may not be dependent on each other, but may share some header information of the parallel coding unit.

At step 3, for each independent coding unit, the coding side may divide the independent coding unit into one or more coding units that do not overlap each other. If the independent coding unit is divided into a plurality of coding units that do not overlap each other, its division manner may be a horizontal equal division method, a vertical equal division method, or a horizontal and vertical equal division method. Of course, the specific implementation is not limited thereto. The coding units in the independent coding unit may be dependent on each other, that is, refer to each other in the process of performing a prediction step.

A width of the coding unit is w_cu, and a height of the coding unit is h_cu. In some examples, the width is greater than the height (unless an edge region). Usually, the coding unit may be fixed w_cu×h_cu, where both w_cu and h_cu are an $N^{th}$ power of 2 (N is greater than or equal to 0), such as 16×4, 8×4, 16×2, 8×2, 4×2, 8×1, and 4×1.

The coding unit may include three components: luminance Y, chrominance Cb, and chrominance Cr (or three components: red R, green G, and blue B), or include only one of the components. If three components are included, sizes of the components may be completely same or different, which is specifically related to an image input format.

Figure 4:
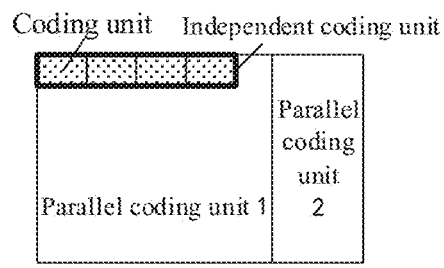
FIG. 4 is a schematic diagram showing correspondences among an image, parallel coding units, an independent coding unit, and coding units according to an example of the present application.

FIG. 4 is a schematic diagram showing correspondences among an image, parallel coding units, an independent coding unit, and coding units. In FIG. 4, an example in which an image is divided into a parallel coding unit 1 and a parallel coding unit 2 based on 3:1, and one independent coding unit includes 4 coding units is taken for illustration.

The prediction processing unit 201 is configured to receive or acquire a real value of an image block and reconstructed image data, and predict the current image block based on related data in the reconstructed image data to obtain a predicted block of the current image block.

The residual calculating unit 202 is configured to calculate a residual value between the real value of the image block and the predicted block of the image block to obtain a residual block, for example, subtract a pixel value of the predicted block from a pixel value of the image block pixel by pixel.

In an example, the residual coding unit 203 is configured to determine a residual coefficient of the current image block based on the residual block. In some examples, this process may include: performing transform such as discrete cosine transform (DCT) or discrete sine transform (DST) on the residual block to obtain a transform coefficient in a transform domain, where the transform coefficient may be referred to as a transform residual coefficient, and the transform residual coefficient may represent the residual block in the transform domain. Of course, the step of transform may not be included.

The quantization unit 204 is configured to quantize the transform coefficient by applying scalar quantization or vector quantization to acquire the quantized transform coefficient, where the quantized transform coefficient may be referred to as a quantized residual coefficient. The quantization process may reduce a bit depth related to some or all transform coefficients. For example, an n-bit transform coefficient may be rounded down to an m-bit transform coefficient during the quantization, where n is greater than m. A quantization degree may be modified by adjusting a quantization parameter (QP). For example, for the scalar quantization, different scales may be applied to achieve finer or coarser quantization. A smaller quantization step size corresponds to the finer quantization, and a larger quantization step size corresponds to the coarser quantization. An appropriate quantization step size may be indicated through QP.

The coefficient coding unit 205 is configured to code the quantized residual coefficient, and output coded image data (that is, a coding result of a current to-be-coded image block) in the form of a coded bit stream. Then, the coded bit stream may be transmitted to a decoder or be stored for subsequent transmission to the decoder or for retrieval. The coefficient coding unit 205 may be further configured to code other syntax element of the current image block, for example, code an index of a prediction mode to a code stream.

In an example, the coefficient coding unit 205 codes the residual coefficient, and a feasible method is a semi-fixed length coding manner. First, a maximum value of residual absolute values in a residual block (RB) is defined as modified maximum (mm). A number of coded bits of a residual coefficient in the RB is determined (numbers of coded bits of residual coefficients in the same RB are consistent). For example, if a coding length (CL) of a current RB is 2, and a current residual coefficient is 1, 2 bits are required for coding the residual coefficient 1 and are represented as 01. If a CL of a previous RB is 7, it is indicated that an 8-bit residual coefficient and a 1-bit sign bit are coded. The determination of CL is to find a minimum M value that satisfies all residuals of a current sub-block are within a range of $[-2^{\wedge}(M-1), 2^{\wedge}(M-1)]$. If there exist two boundary values: $-2^{\wedge}(M-1)$ and $2^{\wedge}(M-1)$ at the same time, M should be increased by 1, that is, M+1 bits are required to code all residuals of the current RB; if there exists only one of the two boundary values: $-2^{\wedge}(M-1)$ and $2^{\wedge}(M-1)$, one Trailing bit needs to be coded to determine whether the boundary value is $-2^{\wedge}(M-1)$ or $2^{\wedge}(M-1)$; if there exists neither one of $-2^{\wedge}(M-1)$ and $2^{\wedge}(M-1)$ in all residuals, the Trailing bit does not need to be coded.

Of course, other residual coefficient coding methods may be used, such as an exponential Golomb coding method, a Golomb-Rice coding method, a truncated unary coding method, a run-length coding method, and a method of directly coding an original residual value.

In addition, for some special cases, an original value may be directly coded, instead of a residual value.

The inverse quantization unit 206 is configured to inversely quantize the quantized coefficient to acquire the inversely quantized coefficient, where the inverse quantization is an inverse application of the quantization unit 204. For example, the inverse quantization unit 206 may apply an inverse quantization solution of a quantization solution applied by the quantization unit 204 based on or with a same quantization step size as the quantization unit 204. The inversely quantized coefficient may be referred to as an inversely quantized residual coefficient.

The residual decoding unit 207 is configured to decode the inversely quantized residual coefficient into a residual block, which may include: performing inverse transform such as inverse discrete cosine transform (DCT) or inverse discrete sine transform (DST) on the inversely quantized coefficient to obtain an inverse transform block in a pixel domain (or referred to as a sample domain). The inverse transform block may be referred to as an inverse transform inversely quantized block or an inverse transform residual block. Of course, the step of inverse transform may not be included.

The reconstruction unit 208 is configured to add the inverse transform block (that is, the inverse transform residual block) to a predicted block to acquire a reconstructed block in the sample domain, and the reconstruction unit 208 may be a summer, which, for example, adds a sample value (that is, a pixel value) of the residual block to a sample value of the predicted block. The reconstructed block output from the reconstruction unit 208 may be subsequently configured to predict other image blocks.

The filter unit 209 (or simply referred to as "filter") is configured to filter the reconstructed block to acquire the filtered block, so as to smoothly perform pixel conversion or improve image quality.

Figure 5:
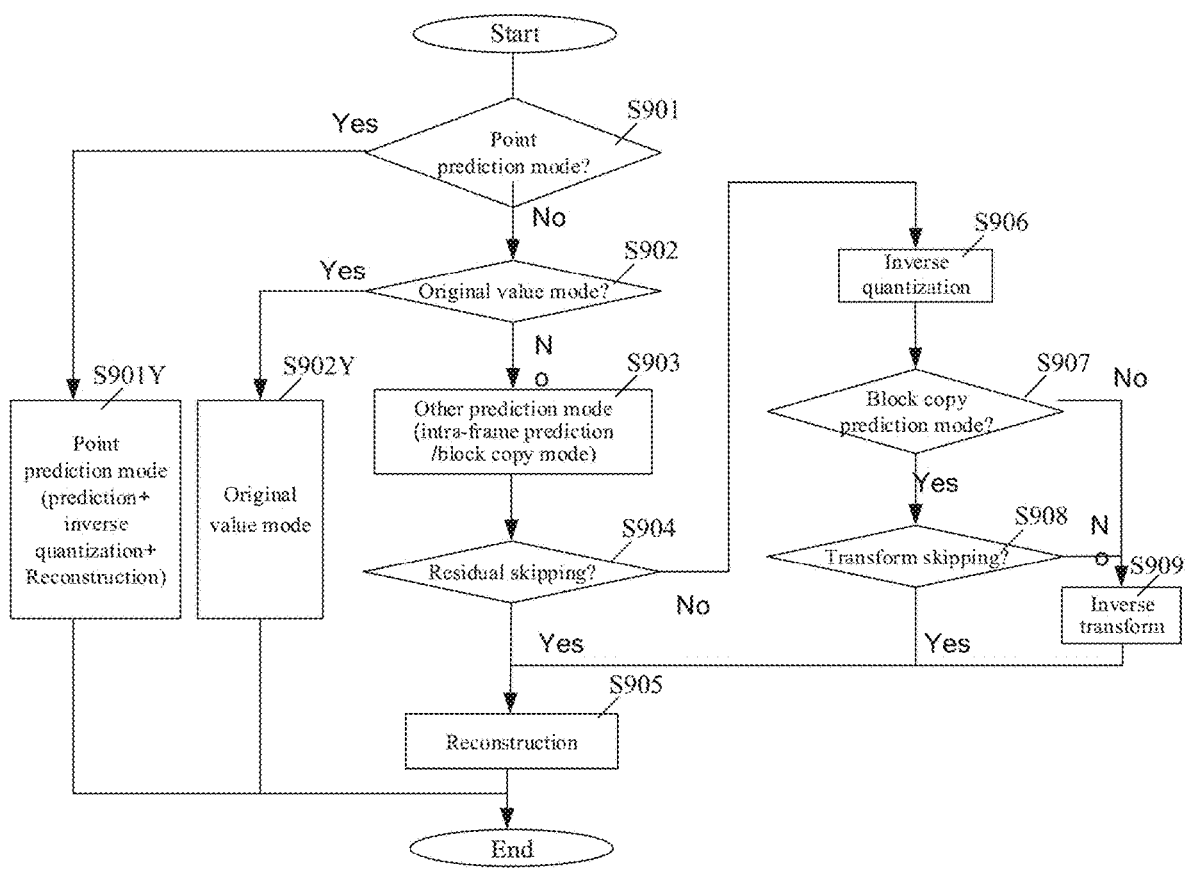
FIG. 5 is a schematic diagram showing a coding process according to an example of the present application.

In an example, a coding process is shown in FIG. 5. Specifically, a coder determines whether a point prediction mode (S901) is used; if a determining result in S901 is yes, prediction is performed based on the point prediction mode, and inverse quantization and reconstruction steps (S901Y) are performed, so as to implement the coding process; if a determining result in S901 is no, it is determined whether an original value mode (S902) is used. If a determining result in S902 is yes, the original value mode is used for coding (S902Y); if a determining result in S902 is no, it is determined that other prediction mode such as an intra-frame prediction mode or a block copy mode is used for prediction (S903). Subsequently, when it is determined that residual skipping is performed in S904, a reconstruction step (S905) is directly performed; when it is determined that no residual skipping is performed in S904, an inverse quantization step (S906) is first performed, and it is determined whether the block copy prediction mode is used (S907). If it is determined that the block copy prediction mode is used, in a case, when it is determined that transform skipping is performed in S908, the reconstruction step (S905) is directly performed, and in another case, when it is determined that no transform skipping is performed in S908, the coding process is implemented by performing inverse transform (S909) and the reconstruction step (S905). If it is determined that the block copy mode is not used in S907 (in this case, a prediction mode used is an intra-frame prediction mode), the inverse transform step (S909) and the reconstruction step (S905) are performed, so as to implement the coding process.

Specifically, in the examples of the present application, the coder 20 is configured to implement a coding method described in the following examples.

Figure 6:
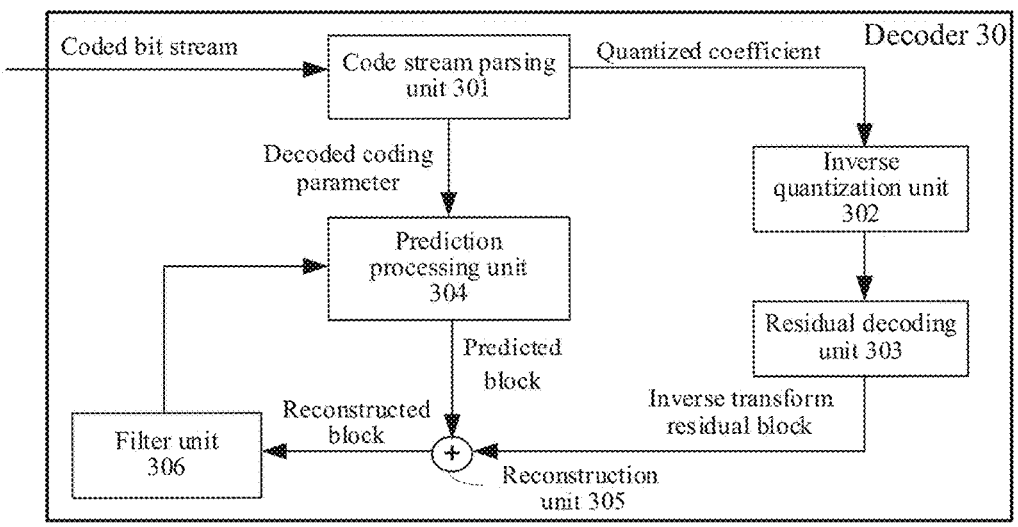
FIG. 6 is a schematic block diagram showing an example of a decoder for implementing an example of the present application.

FIG. 6 is a schematic block diagram showing an example of a decoder 30 for implementing an example of the present application. The decoder 30 is configured to receive coded image data (that is, a coded bit stream, for example, a coded bit stream including an image block and associated syntax elements) coded, for example, by the coder 20 to acquire a decoded image. The decoder 30 includes a code stream parsing unit 301, an inverse quantization unit 302, a residual decoding unit 303, a prediction processing unit 304, a reconstruction unit 305, and a filter unit 306. In some examples, the decoder 30 may perform decoding passes that are roughly reciprocal to coding passes of the coder 20 described in FIG. 2. In some examples, the decoder 30 may further include a buffer and a decoded image buffer.

The buffer is configured to buffer a reconstructed image block output from the reconstruction unit 305, and the decoded image buffer is configured to buffer a filtered image block output from the filter unit 306.

The code stream parsing unit 301 is configured to decode the coded image data to acquire a quantized coefficient and/or a decoded coding parameter (for example, the coding parameter may include any one or all of an inter-frame prediction parameter, an intra-frame prediction parameter, a filter parameter and/or other syntax element). The code stream parsing unit 301 is further configured to forward the decoded coding parameter to the prediction processing unit 304, so that the prediction processing unit 304 performs a prediction process according to the coding parameter.

Functions of the inverse quantization unit 302 may be the same as functions of the inverse quantization unit 206 of the coder 20, and is configured to inversely quantize the quantized coefficient decoded by the code stream parsing unit 301.

Functions of the residual decoding unit 303 may be the same as functions of the residual decoding unit 207 of the coder 20. Functions of the reconstruction unit 305 (for example, a summer) may be the same as functions of the reconstruction unit 208 of the coder 20. The residual decoding unit 303 is configured to perform inverse transform (for example, inverse DCT, inverse integer transform, or a conceptually similar inverse transform process) on the quantized coefficient to obtain an inverse transform block (which may be referred to as an inverse transform residual block), where the inverse transform block is a residual block of a current image block in a pixel domain.

The prediction processing unit 304 is configured to receive or acquire the coded image data (for example, a coded bit stream of the current image block) and reconstructed image data, and the prediction processing unit 304 may further receive or acquire a prediction related parameter and/or information on a selected prediction mode (that is, a decoded coding parameter), for example, from the code stream parsing unit 301, and predict the current image block based on related data in the reconstructed image data and the decoded coding parameter to obtain the predicted block of the current image block.

The reconstruction unit 305 is configured to add the inverse transform block (that is, the inverse transform residual block) to the predicted block to acquire a reconstructed block in a sample domain, for example, add a sample value of the inverse transform residual block to a sample value of the predicted block.

The filter unit 306 is configured to filter the reconstructed block to acquire the filtered block, where the filtered block is a decoded image block.

Specifically, in the examples of the present application, the decoder 30 is configured to implement a decoding method described in the following examples.

It should be understood that, in the coder 20 and the decoder 30 in the examples of the present application, a processing result of a link may be further processed and then output to a next link. For example, after links such as interpolation filtering, and motion vector derivation or filtering, an operation such as clip or shift is further performed on a processing result of a corresponding link.

In an example, a decoding process may include the following steps.

At step 1, the code stream parsing unit 301 parses a prediction mode and a residual coding mode.

At step 2, the code stream parsing unit 301 parses a quantization related value (for example, a near value or a QP value) based on the prediction mode and the residual coding mode.

At step 3, the inverse quantization unit 302 parses a residual coefficient based on the prediction mode and the quantization related value.

At step 4, the prediction processing unit 304 acquires a prediction value of each pixel of a current image block based on the prediction mode.

At step 5, the residual decoding unit 303 acquires a residual value of each pixel of the current image block by decoding based on the residual coefficient.

At step 6, the reconstruction unit 305 acquires a reconstruction value based on the prediction value and the residual value of each pixel of the current coded unit.

Image coding and decoding methods provided in the examples of the present application will be described below with reference to the accompanying drawings.

A coding side in any example of the present application may be the coder in FIG. 2 or FIG. 3, or be the source device in FIG. 2; and a decoding side in any example of the present application may be the decoder in FIG. 2 or FIG. 6, or be the target device in FIG. 2.

Embodiment 1

Figure 7A:
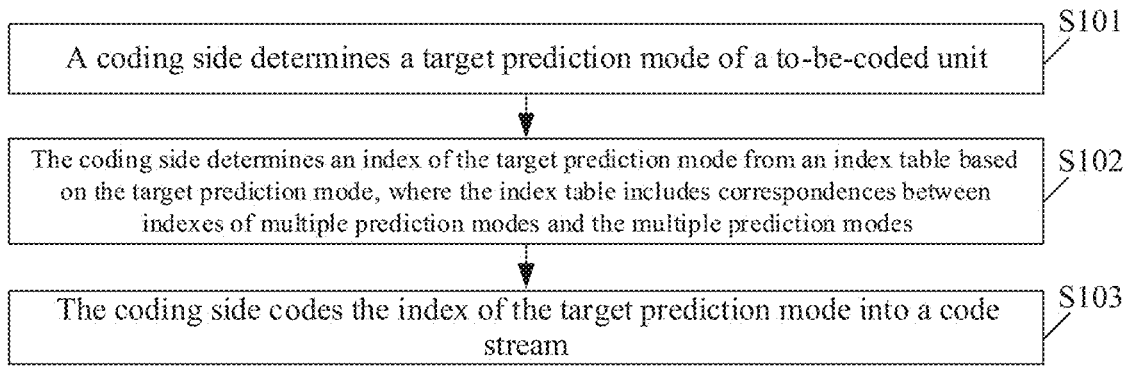
FIG. 7A is a first schematic flowchart showing an image coding method according to an example of the present application.

FIG. 7A is a schematic flowchart showing an image coding method according to an example of the present application. The method shown in FIG. 7A includes the following steps:

At S101, a coding side determines a target prediction mode of a to-be-coded unit.

The to-be-coded unit may be any to-be-coded image block (that is, a coding unit) in a to-be-coded image.

The target prediction mode may be one of multiple pre-defined prediction modes, and specifically, may be an original value mode, or be a prediction mode other than the original value mode. In an example, other prediction modes include a combination of any one or more of at least one point prediction mode, at least one intra-frame prediction mode, and at least one block copy mode. For example, other prediction modes include 3 prediction modes: a point prediction mode, an intra-frame prediction mode, and a block copy mode. For another example, other prediction modes include 5 prediction modes: a point prediction mode 0, a point prediction mode 1, an intra-frame prediction mode 0, a block copy mode 0, and a block copy mode 1. In another example, other prediction modes include a combination of any one or more of: at least one point prediction mode, at least one intra-frame prediction mode, at least one block copy mode based on normal residual coding, at least one point prediction mode and at least one intra-frame prediction mode based on skip residual coding, and at least one block copy mode. This example may be considered as combining a prediction mode in conventional technologies with a residual coding mode, so as to obtain a new prediction mode defined in the examples of the present application.

When the prediction mode is a point prediction mode based on normal residual coding, the coding side codes a residual coefficient by using the normal residual coding mode, and predicts a pixel value of the to-be-coded unit by using the point prediction mode. When the prediction mode is other mode, operations are similar to this, which will not be described herein again.

At S102, the coding side determines an index of the target prediction mode from an index table based on the target prediction mode. The index table includes correspondences between indexes of multiple prediction modes and the multiple prediction modes.

In some examples, the correspondences between multiple prediction modes and their respective indexes may be stored in an index table, and of course, be stored in other manner, which is not limited in the examples of the present application.

In some examples, the coding side jointly codes the indexes of multiple prediction modes. For example, the indexes of multiple prediction modes are coded in a truncated unary coding method, that is, the indexes of multiple prediction modes are generated in the truncated unary coding method, for example, reference may be made to the following example 1 and example 2. For another example, the indexes of multiple prediction modes are coded in a binary tree method, for example, reference may be made to the following example 3.

In some examples, a code word length (that is, a number of binary characters, which may be referred to as a coding length) of an index of the original value mode is greater than or equal to a code word length of an index of other prediction mode. In some examples, a code word length of an index of a prediction mode is related to a usage frequency of the prediction mode. The usage frequency here may be obtained based on big data statistics, and its statistical method is not limited in the examples of the present application. For example, for a prediction mode with a higher usage frequency, a code word length of its index is shorter. Of course, for multiple prediction modes, there may be some of the prediction modes whose indexes meet rules shown in this optional implementation manner. Further In some examples, there may be multiple prediction modes whose indexes have the same code word length.

At S103, the coding side codes the index of the target prediction mode into a code stream.

Figure 7B:
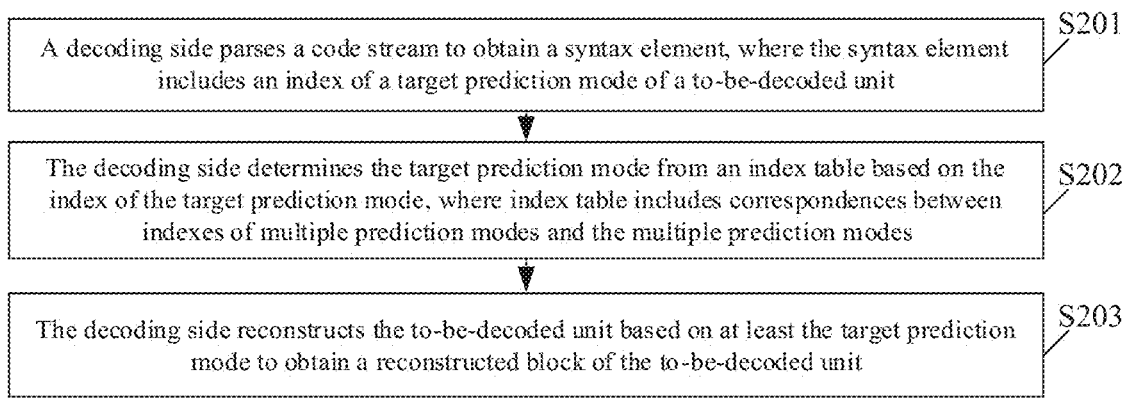
FIG. 7B is a schematic flowchart showing an image decoding method corresponding to that in FIG. 7A according to an example of the present application.

FIG. 7B shows an image decoding method according to an example of the present application. The image decoding method corresponds to the image coding method shown in FIG. 7A. The method shown in FIG. 7B includes the following steps.

At S201, a decoding side parses a code stream to obtain a syntax element, where the syntax element includes an index of a target prediction mode of a to-be-decoded unit.

The to-be-decoded unit may be obtained by coding the to-be-coded unit in the method shown in FIG. 7A.

In some examples, the coding side jointly codes indexes of multiple prediction modes. For example, the indexes of multiple prediction modes are coded in a truncated unary coding method, that is, the indexes of multiple prediction modes are generated in the truncated unary coding method.

In some examples, a code word length of an index of an original value mode is greater than or equal to a code word length of an index of other prediction mode.

In some examples, a code word length of an index of a prediction mode is related to a usage frequency of the prediction mode. For example, for a prediction mode with a higher usage frequency, a code word length of its index is shorter.

At S202, the decoding side determines the target prediction mode from an index table based on the index of the target prediction mode. The index table includes correspondences between indexes of multiple prediction modes and the multiple prediction modes.

At S203, the decoding side reconstructs the to-be-decoded unit based on at least the target prediction mode to obtain a reconstructed block of the to-be-decoded unit.

In an example, the decoding side predicts a pixel value of the to-be-decoded unit based on the target prediction mode to obtain a predicted block. Next, the decoding side parses the code stream to obtain information on a residual block of the to-be-decoded unit, and obtains a residual block of the to-be-decoded unit based on the information. Then, the decoding side reconstructs the to-be-decoded unit based on the predicted block and the residual block to obtain the reconstructed block.

The process in which the decoding side reconstructs the to-be-decoded unit based on at least the target prediction mode is not limited thereto. In another example, the decoding side may reconstruct the to-be-decoded unit based on the following method in FIG. 21.

At the coding side, an additional bit is usually used to indicate whether the prediction mode of the current image block (that is, the to-be-coded unit) is the original value mode. For example, the bit may be denoted as org_flag. If org_flag is "1", it is indicated that the prediction mode of the current block is the original value mode; if org_flag is "0", it is indicated that the prediction mode of the current block is not the original value mode. If the prediction mode of the current block is not the original value mode, an index of other prediction mode is further coded into the code stream. However, because a probability of using the original value mode is very low, one org_flag "0" needs to be coded into a code stream in most image blocks, which will cause a waste of transmission resources (that is, increase code stream transmission overhead). In addition, no matter whether the prediction mode is the original value prediction mode, the decoding side needs to first decode the flag bit org_flag, increasing decoding complexity of the decoding side.

In the image coding method shown in FIG. 7A provided in the examples of the present application, the index of the target prediction mode is determined from the index table directly based on the target prediction mode, and a flag (for example, a flag bit org_flag) representing whether the target prediction mode is the original value mode may not be coded into the code stream. Because, in most cases, the original value mode is not used as the target prediction mode, for example, a point prediction mode or an intra-frame prediction mode is usually used, the flag bit (org_flag) representing whether the original value mode is used in a conventional solution does not need to be coded, which helps to save code stream transmission overhead.

Correspondingly, in the image decoding method provided in FIG. 7B in the examples of the present application, the target prediction mode may be determined from the index table directly based on the index of the target prediction mode, and the flag bit org_flag does not need to be parsed, reducing decoding complexity of the decoding side.

The image decoding method shown in FIG. 7B corresponds to the image coding method shown in FIG. 7A, and therefore, the image decoding method helps to save code stream transmission overhead.

Example 1: Assuming that multiple prediction modes include an original value mode, a point prediction mode, an intra-frame prediction mode, and a block copy mode, a feasible method is to code indexes of the prediction modes by using a truncated unary coding method, where an index of the original value mode uses a longer code word, and indexes of other prediction modes use a shorter code word. For example, a code word of an index of the point prediction mode is 0, a code word of an index of the intra-frame prediction mode is 10, a code word of an index of the block copy mode is 111, and a code word of an index of the original value mode is 110. Based on this solution, because the point prediction mode or the intra-frame prediction mode is used in most cases, the flag bit (org_flag) representing whether the original value mode is used does not need to be coded.

Based on this example, an index table may be shown in Table 1:

TABLE 1 an index table coded in a truncated unary coding method

| Prediction mode | Index of prediction mode |
|---|---|
| Point prediction mode | 0 |
| Intra-frame prediction mode | 10 |
| Block copy mode | 111 |
| Original value mode | 110 |

Example 2: It is assumed that multiple prediction modes include an original value mode, a point prediction mode based on normal residual coding, an intra-frame prediction mode based on normal residual coding, a block copy mode based on normal residual coding, a point prediction mode based on skip residual coding, an intra-frame prediction mode based on skip residual coding, and a block copy mode based on skip residual coding; and the point prediction mode based on the normal residual coding mode, the intra-frame prediction mode based on the normal residual coding mode, and the block copy mode based on the normal residual coding mode are sequentially denoted as a common point prediction mode (mode 1), a common intra-frame prediction mode (mode 2), and a common block copy mode (mode 3); the point prediction mode based on the skip residual coding mode, the intra-frame prediction mode based on the skip residual coding mode, and the block copy mode based on the skip residual coding mode are sequentially denoted as a special point prediction mode (mode 4), a special intra-frame prediction mode (mode 5), and a special block copy mode (mode 6). There are a total of 7 prediction modes by adding the original value mode (mode 7). Therefore, a feasible method is to code indexes of the prediction modes in a truncated unary coding method, and code words of the modes 1-7 are 0, 10, 110, 1110, 11110, 111110, and 111111 respectively.

Based on this example, an index table may be shown in Table 2:

TABLE 2 an index table coded in a truncated unary coding manner

| Prediction mode | Index of prediction mode |
|---|---|
| Common point prediction mode | 0 |
| Common intra-frame prediction mode | 10 |
| Common block copy mode | 110 |
| Special point prediction mode | 1110 |
| Special intra-frame prediction mode | 11110 |
| Special block copy mode | 111110 |
| Original value mode | 111111 |

Example 3: Indexes of multiple prediction modes are coded in a binary tree method. Table 3 shows a coding method.

TABLE 3 an index table coded in a binary tree method

| Prediction mode serial number | Prediction mode | Index of prediction mode | Coding length (number of binary symbols) |
|---|---|---|---|
| 0 | Point prediction mode 0 | 0010 | 4 |
| 1 | Point prediction mode 1 | 0011 | 4 |
| 2 | Point prediction mode 2 | 0000 | 4 |
| 3 | Point prediction mode 3 | 0001 | 4 |
| 4 | Intra-frame prediction mode 0 | 11 | 2 |
| 5 | Intra-frame prediction mode 1 | 1011 | 4 |
| 6 | Intra-frame prediction mode 2 | 1010 | 4 |
| 7 | Intra-frame prediction mode 3 | 10011 | 5 |
| 8 | Intra-frame prediction mode4 | 10010 | 5 |
| 9 | Intra-frame prediction mode 5 | 100001 | 6 |
| 10 | Intra-frame prediction mode 6 | 100000 | 6 |
| 11 | Original value mode | 10001 | 5 |
| 12 | Intra-frame block copy mode 0 | 011 | 3 |
| 13 | Intra-frame block copy mode 1 | 0101 | 4 |
| 14 | Intra-frame block copy mode 2 | 0100 | 4 |

In Table 3, an example in which multiple prediction modes include the above 15 prediction modes is taken for description. In actual implementation, the index table shown in Table 3 may include only two columns: prediction mode and index of prediction mode, or include 3 columns: prediction mode serial number, prediction mode and index of prediction mode.

The indexes of the multiple prediction modes in Table 3 are generated according to the following rules:

First, "0" and "1" are respectively used as the highest flag bits for indexes of "point prediction mode, intra-frame block copy mode" and "intra-frame prediction mode, original value mode".

Second, for "point prediction mode, intra-frame block copy mode", "0" and "1" are respectively used as the second highest flag bits of indexes of "point prediction mode" and "intra-frame block copy mode".

Next, for "point prediction mode", "1" and "0" are respectively used as the third flag bits of indexes of "point prediction modes 0-1" and "point prediction modes 2-3".

Finally, for "point prediction modes 0-1", "0" and "1" are respectively used as the fourth flag bits of indexes of "point prediction mode 0" and "point prediction mode 1".

Therefore, it can be obtained that the indexes of the point prediction mode 0 and the point prediction mode 1 are respectively "0010" and "0011". Manners of generating indexes of other prediction modes are similar to this, which will not be described herein again.

For "intra-frame prediction modes 0-6", "1" and "0" are respectively used as the second highest bits of indexes of "intra-frame prediction mode 0" and "intra-frame prediction modes 1-6". Indexes of other intra-frame prediction modes will not be described one by one. Manners of generating indexes of intra-frame block copy modes are similar to this.

In some examples, a coding length of an index of a prediction mode is related to a usage frequency of the prediction mode. In an example, referring to Table 3, considering that use frequencies of the point prediction modes 0-3 are roughly same, coding lengths of indexes thereof are set to be the same; considering that a use frequency of the intra-frame prediction mode 0 is higher than use frequencies of the intra-frame prediction modes 1-6, a coding length of an index of the intra-frame prediction mode 0 is shorter than coding lengths of indexes of the intra-frame prediction modes 1-6. Other examples are not be listed one by one.

In some examples, an index of a prediction mode is not used as a prefix of an index of another prediction mode. For example, an index for a prediction mode 0 is "11", and none of prefixes of indexes of other 14 prediction modes are "11". This is a technical solution proposed considering that "if prefixes of indexes of one or more prediction modes are "11", when a decoding side identifies "11", whether a prediction mode is the prediction mode 0 or the one or more prediction modes cannot be determined", which helps the decoding side to decode quickly.

Specific implementation manners of generating indexes of multiple prediction modes in a binary tree method are not limited to Table 3.

For example, in Table 3, coding lengths of indexes of the point prediction modes 0-3 are equal, and in specific implementation, coding lengths of indexes of any two point prediction modes may be unequal, for example, reference may be made to manners of generating indexes of the intra-frame prediction modes 0-6.

For example, coding lengths of indexes of the intra-frame prediction modes 0-6 may be equal, for example, reference may be made to manners of generating indexes of the point prediction modes 0-3.

For example, in Table 3, "0" and "1" are respectively used as the highest flag bits of indexes of "point prediction mode, intra-frame block copy mode" and "intra-frame prediction mode, original value mode"; in specific implementation, "1" and "0" may be respectively used as the highest flag bits of indexes of "point prediction mode, intra-frame block copy mode" and "intra-frame prediction mode, original value mode".

Other examples will not be listed one by one.

Embodiment 2

Figure 8A:
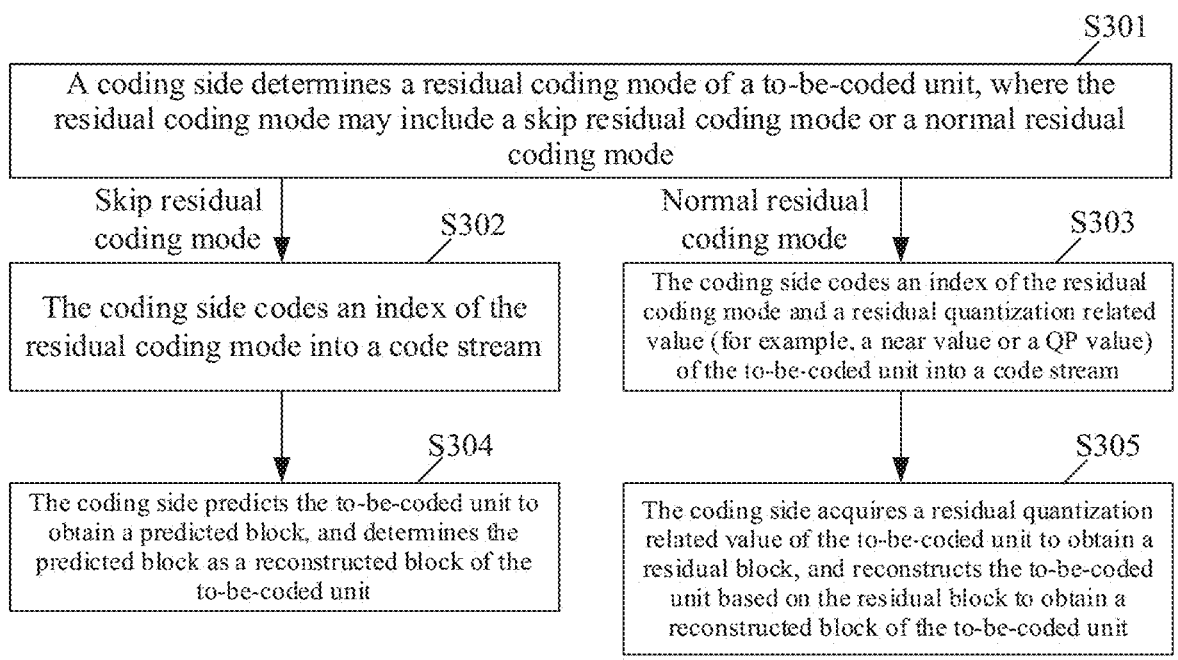
FIG. 8A is a second schematic flowchart showing an image coding method according to an example of the present application.

FIG. 8A is a schematic diagram showing an image coding method according to an example of the present application. The method shown in FIG. 8A includes the following steps.

At S301, a coding side determines a residual coding mode of a to-be-coded unit. The residual coding mode may include a skip residual coding mode or a normal residual coding mode.

For related explanation of the to-be-coded unit, the skip residual coding mode, and the normal residual coding mode, reference may be made to the above text, which will not be described herein again.

At S302, if the residual coding mode is the skip residual coding mode, the coding side codes an index of the residual coding mode into a code stream. In this case, a residual quantization related value (for example, a near value or a QP value) of the to-be-coded unit does not need to be coded into the code stream.

At S303, if the residual coding mode is the normal residual coding mode, the coding side codes an index of the residual coding mode and a residual quantization related value (for example, a near value or a QP value) of the to-be-coded unit into a code stream. In an example, the coding side first codes the index of the residual coding mode, and then codes the residual quantization related value of the to-be-coded unit.

At S304, if the residual coding mode is the skip residual coding mode, the coding side predicts the to-be-coded unit to obtain a predicted block, and determines the predicted block as a reconstructed block of the to-be-coded unit. In this case, the residual quantization related value of the to-be-coded unit does not need to be acquired.

At S305, if the residual coding mode is the normal residual coding mode, the coding side acquires a residual quantization related value of the to-be-coded unit to obtain a residual block, and reconstructs the to-be-coded unit based on the residual block to obtain a reconstructed block of the to-be-coded unit.

S304-S305 may be considered as a reconstruction process performed by the coding side.

Figure 8B:
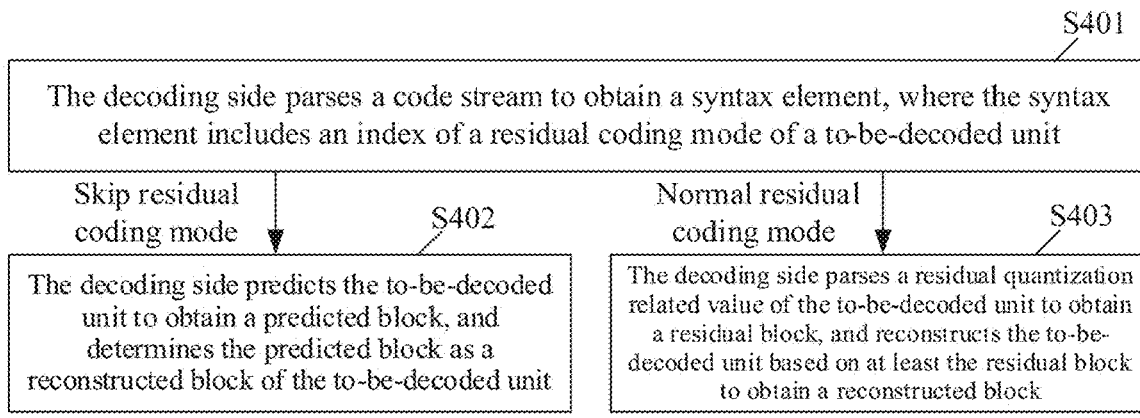
FIG. 8B is a schematic flowchart showing an image decoding method corresponding to that in FIG. 8A according to an example of the present application.

FIG. 8B is a schematic diagram showing an image decoding method according to an example of the present application. The image decoding method corresponds to the image coding method shown in FIG. 8A. The method shown in FIG. 8B includes the following steps.

At S401, the decoding side parses a code stream to obtain a syntax element. The syntax element includes an index of a residual coding mode of a to-be-decoded unit. The to-be-decoded unit may be an image block obtained after the to-be-coded unit is coded according to the method shown in FIG. 8A.

At S402, if the index of the residual coding mode indicates a skip residual coding mode, the decoding side predicts the to-be-decoded unit to obtain a predicted block, and determines the predicted block as a reconstructed block of the to-be-decoded unit. Because the residual coding mode is the skip residual coding mode, that is, all residual values of the to-be-decoded unit are 0, the predicted block may be directly used as the reconstructed block.

At S403, if the index of the residual coding mode indicates a normal residual coding mode, the decoding side parses a residual quantization related value of the to-be-decoded unit to obtain a residual block, and reconstructs the to-be-decoded unit based on at least the residual block to obtain a reconstructed block.

In an example, the syntax element may further include a prediction mode of the to-be-decoded unit, and the decoding side predicts the to-be-decoded unit based on the prediction mode to obtain a predicted block, and reconstructs the to-be-decoded unit based on the residual block and the predicted block to obtain a reconstructed block. A process of reconstructing the to-be-decoded unit based on at least the residual block is not limited thereto. In another example, reconstruction is performed based on the method shown in FIG. 21 to obtain a reconstructed block.

Usually, 1 flag bit (denoted as res_skip_flag) is used to indicate whether the skip residual coding mode is used for a current block, and the residual quantization related value is coded (decoded) before res_skip_flag, so that, even if res_skip_flag is 1, the residual quantization related value needs to be coded (decoded). In this case, the residual quantization related value is redundant, so that this technical solution increases not only code stream transmission overhead between the coding side and the decoding side, but also decoding complexity of the decoding side.

In the image coding method provided in FIG. 8A in the examples of the present application, considering "if the residual coding mode is the skip residual coding mode (for example, res_skip_flag is 1), the residual coefficient does not need to be coded or decoded, and therefore, the residual quantization related value (for example, a near value or a QP value) does not need to be coded (decoded)", it is proposed that the coding side first codes information on the residual coding mode (such as an index of the residual coding mode, for example, res_skip_flag), and then determines whether the residual quantization related value (for example, a near value or a QP value) is coded based on the residual coding mode. In this way, when the residual coding mode is the skip residual coding mode, the residual quantization related value does not need to be coded, which helps to save code stream transmission overhead.

Correspondingly, in the image decoding method provided in FIG. 8B in the examples of the present application, information on the residual coding mode (such as an index of the residual coding mode, for example, res_skip_flag) may be first parsed, and then whether the residual quantization related value (for example, a near value or a QP value) is parsed is determined based on the residual coding mode, which reduces decoding complexity of the decoding side.

Embodiment 3

Figure 9A:
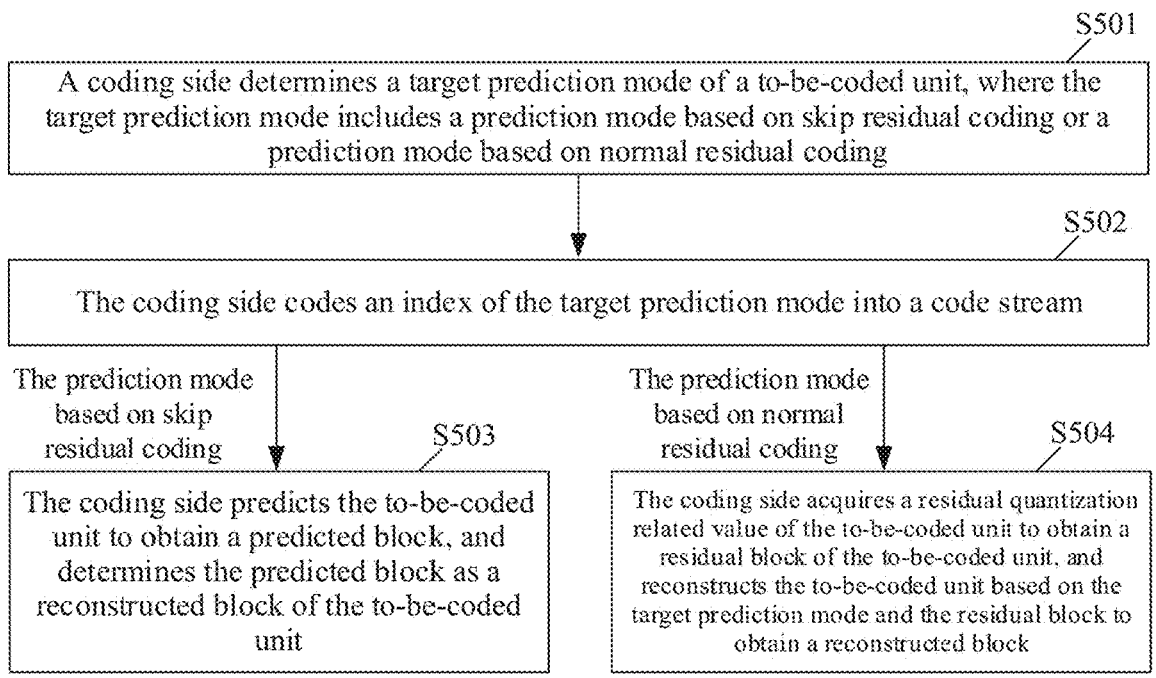
FIG. 9A is a third schematic flowchart showing an image coding method according to an example of the present application.

FIG. 9A is a schematic diagram showing an image coding method according to an example of the present application. The method shown in FIG. 9A includes the following steps:

At S501, a coding side determines a target prediction mode of a to-be-coded unit. The target prediction mode includes a prediction mode based on skip residual coding or a prediction mode based on normal residual coding.

The prediction mode based on skip residual coding and the prediction mode based on normal residual coding may be considered as combining a prediction mode and a residual coding mode, so as to obtain a new prediction mode defined in the examples of the present application.

In an example, the prediction mode based on skip residual coding includes: a point prediction mode based on skip residual coding, an intra-frame prediction mode based on skip residual coding, or a block copy mode based on skip residual coding.

In an example, the prediction mode based on normal residual coding includes: a point prediction mode, an intra-frame prediction mode, or a block copy mode based on normal residual coding.

At S502, the coding side codes an index of the target prediction mode into a code stream.

In an example, for a manner of generating the index of the target prediction mode, reference may be made to related implementation in the example shown in FIG. 7A, for example, indexes of multiple prediction modes are jointly coded, for example, the indexes of multiple prediction modes are coded in a truncated unary coding manner. Of course, the specific implementation is not limited thereto. In another example, the index of the target prediction mode may be coded into the code stream in a conventional manner of, for example, first coding a flag bit org_flag.

At S503, if the target prediction mode is the prediction mode based on skip residual coding, the coding side predicts the to-be-coded unit to obtain a predicted block, and determines the predicted block as a reconstructed block of the to-be-coded unit.

At S504, if the target prediction mode is the prediction mode based on normal residual coding, the coding side acquires a residual quantization related value of the to-be-coded unit to obtain a residual block of the to-be-coded unit, and reconstructs the to-be-coded unit based on the target prediction mode and the residual block to obtain a reconstructed block.

S503-S504 may be considered as a reconstruction process performed by the coding side.

In an example, reconstructing the to-be-coded unit based on the target prediction mode and the residual block may include: predicting the to-be-coded unit based on the target prediction mode to obtain a predicted block, and reconstructing the to-be-coded unit based on the predicted block and the residual block. Of course, the specific implementation is not limited thereto, and in another example, reconstruction is performed based on the method shown in FIG. 21 to obtain a reconstructed block.

Figure 9B:
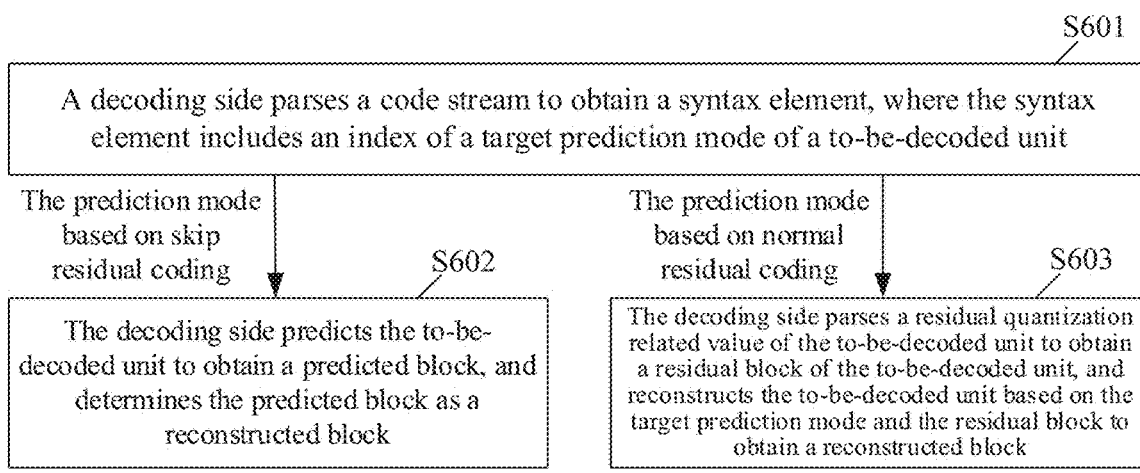
FIG. 9B is a schematic flowchart showing an image decoding method corresponding to that in FIG. 9A according to an example of the present application.

FIG. 9B is a schematic diagram showing an image decoding method according to an example of the present application. The image decoding method corresponds to the image coding method shown in FIG. 9A. The method shown in FIG. 9B includes the following steps.

At S601, a decoding side parses a code stream to obtain a syntax element, where the syntax element includes an index of a target prediction mode of a to-be-decoded unit. The target prediction mode includes an index of a prediction mode based on skip residual coding or an index of a prediction mode based on normal residual coding.

At S602, if the target prediction mode is the prediction mode based on skip residual coding, the decoding side predicts the to-be-decoded unit to obtain a predicted block, and determines the predicted block as a reconstructed block.

At S603, if the target prediction mode is the prediction mode based on normal residual coding, the decoding side parses a residual quantization related value of the to-be-decoded unit to obtain a residual block of the to-be-decoded unit, and reconstructs the to-be-decoded unit based on the target prediction mode and the residual block to obtain a reconstructed block.

In an example, reconstructing the to-be-decoded unit based on the target prediction mode and the residual block may include: predicting the to-be-decoded unit based on the target prediction mode to obtain a predicted block, and reconstructing the to-be-decoded unit based on the predicted block and the residual block. Of course, the specific implementation is not limited thereto, and in another example, reconstruction is performed based on the method shown in FIG. 21 to obtain a reconstructed block.

The image coding and decoding methods shown in FIG. 9A and FIG. 9B have at least the following beneficial effects: conventional residual coding mode and prediction mode are combined as a new prediction mode provided in the examples of the present application, where the residual coding mode and the prediction mode do not need to be respectively coded (decoded), and only the new prediction mode needs to be uniformly coded (decoded), of which implementation logic is simple, helping to save code stream transmission overhead. Or, the coding side may use the residual skip mode as a prediction mode for coding. The coding side (the decoding side) first codes (decodes) a prediction mode, and then determines whether a residual quantization related value (for example, a near value or a QP value) needs to be parsed based on the prediction mode, so as to save a code rate. In addition, information on the residual coding mode (such as an index of the residual coding mode, for example, res_skip_flag) is first coded (or decoded), and then whether the residual quantization related value (for example, a near value or a QP value) is coded (or decoded) is determined based on the residual coding mode, so that, when the residual coding mode is the skip residual coding mode, the residual quantization related value does not need to be coded (or decoded), which helps to save code stream transmission overhead.

For example, according to the coding method shown in the example 2, the decoding side may know, based on the prediction mode, whether a residual of the to-be-coded unit corresponding to the to-be-decoded unit needs to be coded. For modes in which a residual does not need to be coded (such as modes 4, 5, 6 and 7), a residual quantization related value (for example, a near value or a QP value) does not need to be coded (decoded).

Embodiment 4

FIG. 10 shows an image reconstruction method according to an example of the present application, which may be applied to an image coding method or an image decoding method. The method shown in FIG. 10 may include the following steps.

At S701, a prediction mode of at least one prediction group into which a current image block is divided is determined. Any one of the at least one prediction group includes a plurality of consecutive pixels located in a same row; the any one prediction group includes a first specified pixel region and a second specified pixel region, where the first specified pixel region includes a plurality of pixel groups, the plurality of pixel groups are obtained by dividing according to the second specified pixel region, and prediction manners of the first specified pixel region and the second specified pixel region are different. The plurality of pixel groups may be predicted in parallel, and one pixel group includes one or more consecutive pixels.

When this example is applied to an image coding method, an execution subject of the example may be a coding side, and the current image block is specifically a to-be-coded image block or a to-be-coded unit.

When this example is applied to an image decoding method, an execution subject of the example may be a decoding side, and the current image block may be specifically a to-be-decoded image block or a to-be-decoded unit. S701 may include: parsing a code stream to obtain indexes of prediction modes of any one or more of the at least one prediction group into which the current image block is divided.

A size of the current image block is not limited in the examples of the present application, for example, a width of the current image block is greater than a height of the current image block. For example, the size of the current image block is 16*2, 8*2, 8*1, or the like.

In an example, the current image block may be divided into one prediction group, which is equivalent to that the current image block is not divided into prediction groups. In this case, all pixels in the current image block are used as one prediction group.

In another example, the current image block may be divided into a plurality of prediction groups.

A division manner of prediction groups of the current image block and a prediction mode of each prediction group are not limited in the examples of the present application. A division mode and a prediction mode based on the division mode are collectively referred to as a "division prediction mode" hereinafter.

In an example, one prediction group may be composed of all/some pixels in one/more rows of the current image block, which, of course, may be implemented in other manners. In principle, one prediction group includes a plurality of consecutive pixels located in a same row.

In an example, a number of a plurality of consecutive pixels included in one prediction group is greater than or equal to a predetermined threshold. This is considered that, when a number of a plurality of consecutive pixels in one prediction group is larger, if the pixels in the prediction group are predicted in serial, prediction for the prediction group may be time-consuming. In this case, if this solution is used, a plurality of pixel groups in one prediction group may be predicted in parallel, which helps to reduce the prediction time for the prediction group.

If there is no dependency relationship between pixels in two pixel groups in a prediction process, the two pixel groups may be predicted in parallel. A number of pixels included in different pixel groups may be equal or unequal.

Pixels specifically included in the first specified pixel region and the second specified pixel region, and manners of predicting these pixels are not limited in the examples of the present application. In principle, any configuration of "the first specified pixel region and the second specified pixel region, as well as the prediction mode" that satisfies "the plurality of pixel groups may be predicted in parallel, and one pixel group includes one or more consecutive pixels" may be used.

FIG. 11 shows a manner of dividing parallel pixel groups according to an example of the present application. In FIG. 11, a plurality of consecutive pixels located in a same row in one prediction group are pixels 1-12, pixels included in a second specified pixel region are pixels 3, 7 and 11, and pixels included in a first specified pixel region are pixels 1-2, 4-6, 8-10 and 12. A plurality of pixel groups are pixel groups 1-4, where the pixel groups 1-3 each include a plurality of pixels, and the pixel group 4 includes a single pixel. A number of pixels included in the pixel group 2 is equal to a number of pixels included in the pixel group 3, and is not equal to a number of pixels included in other pixel groups.

In an example, vertical prediction is used in the first specified pixel region, and horizontal prediction is used in the second specified pixel region. In this way, parallel prediction between multiple pixel groups can be implemented.

In another example, vertical prediction is used in the first specified pixel region, and vertical mean prediction is used in the second specified pixel region. In this way, parallel prediction among multiple pixel groups can be implemented.

In some examples, differences in numbers of pixels included in different pixel groups are equal to or less than a threshold, which helps to implement that numbers of pixels included in a plurality of pixel groups are equal or as equal as possible, and therefore prediction durations of different pixel groups predicted in parallel are same or roughly same, shortening a total prediction duration of one prediction group.

At S702, the current image block is reconstructed based on the prediction mode of the at least one prediction group to obtain a reconstructed block.

For example, for any one of at least one prediction group, the prediction group is predicted based on a prediction mode of the prediction group to obtain a predicted block of the prediction group; and a residual block of the prediction group is acquired; then, a reconstructed block of the prediction group is acquired based on the predicted block and the residual block.

Of course, there may be other implementation manners, for example, when all values in the residual block are 0, the predicted block is directly used as the reconstructed block. As another example, reconstruction is performed based on the method shown in FIG. 21 to obtain a reconstructed block.

In the image reconstruction method shown in FIG. 11, when prediction is performed, a plurality of pixel groups in one prediction group may be predicted in parallel, which helps to shorten a total prediction duration of the prediction group. The image decoding method shown in FIG. 11 may be considered as a new point prediction mode according to an example of the present application.

In an extended example, "row" in the image reconstruction method shown in FIG. 11 may be replaced with "column" to constitute a new example, so as to solve a problem that, in a current image block with its height being greater than its width (for example, a size of the current image block is 2*16, 2*8 or 1*8), a prediction process is time-consuming because of failure to be performed in parallel in the prediction process. In this case, in an example, horizontal prediction is used in the first specified pixel region, and vertical prediction is used in the second specified pixel region. In another example, horizontal prediction is used in the first specified pixel region, and horizontal mean prediction is used in the second specified pixel region. Other related examples may be derived from the related description of FIG. 11 in the present application, which will not be described herein again.

The image reconstruction method shown in FIG. 11 will be described below by using specific examples.

A current image block of 16×2 may be specifically a luminance block of 16×2, or a chrominance block of 16×2.

1) A prediction division mode of the current image block of 16×2 is shown in FIG. 12, where the current image block includes Groups 1-2. Specifically, the Group 1 is composed of pixels in a second row, and horizontal prediction is used in the Group 1; the Group 2 is composed of pixels in a first row, and vertical mean prediction is used in the Group 2. For the pixels in the Group 2, reference may be made to pixels in a last row of an adjacent image block of 16×2 on their upper side.

As shown in FIG. 12, coding of a second pixel in the Group 2 depends on a reconstruction value of a first pixel, therefore, coding of the first pixel and the second pixel cannot be performed in parallel, and decoding thereof is similar. In addition, coding of a first pixel in the Group 1 depends on the reconstruction value of the first pixel in the Group 2, so that coding or decoding thereof cannot be simultaneously performed. It can be seen that this prediction division mode has a problem of low parallelism, which is not conducive to hardware implementation.

Figure 13B:
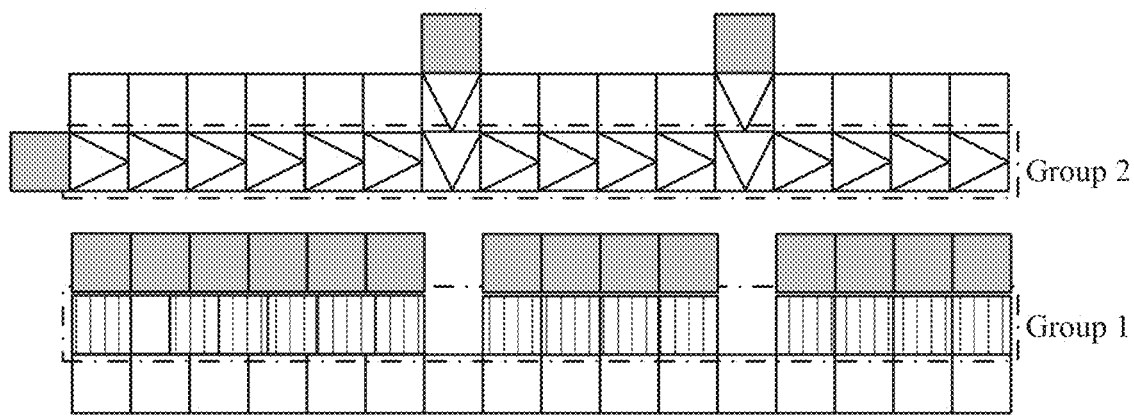

In order to improve parallelism in a prediction process, in the example shown in FIG. 11 applied to the examples of the present application, the prediction division mode of the current image block of 16×2 may be shown in FIG. 13A or FIG. 13B. The prediction division mode of the current image block shown in FIG. 13A and FIG. 13B is the same as that in FIG. 12, but their prediction modes are different. Specifically, for any one current image block of 16×2, reference may be made to values in one column on its left side (2 pixels) and in one row on its upper side (16 pixels). The leftmost pixel of the current image block of 16×2 is referred to as a first pixel.

In solution 1, as shown in FIG. 13A, the prediction mode includes:
- a) For a $(kN+1)^{th}$ pixel (N is preferably 4, and k=1, 2 or 3) in the Group 1 and the Group 2, a reconstruction value of a pixel on its upper side is used as a prediction value of the current pixel.
- b) In the pixels in the Group 2, except a $(kN+1)^{th}$ pixel (N is preferably 4, and k=1, 2 or 3), for other pixel, a reconstruction value of a pixel on its left side is used as a prediction value of the current pixel.
- c) In some examples, in the pixels in the Group 1, except a $(kN+1)^{th}$ pixel (N is preferably 4, and k=1, 2 or 3), a prediction value of other pixel is a predetermined value (that is, a default value). In some examples, for other pixel, a mean (for example, $(P0+P1+1)>>1$) of a reconstruction value of a pixel on its upper side (a reconstruction value of adjacent other block on its upper side, denoted as P0) and a reconstruction value of a pixel on its lower side (a reconstruction value in the Group 2, denoted as P1) is used as a prediction value of the current pixel, where ">>" represents that an integer shifts right. "$\alpha>>N$" represents that a shifts right by N bits, similar to a divided by an $N^{th}$ power of 2, so that ">>1" is equivalent to being divided by 2.

In solution 2, as shown in FIG. 13B, the prediction mode includes:
- d) For a $(kN+2)^{th}$ pixel (N is preferably 5, and k=1, 2) in the Group 1 and the Group 2, a reconstruction value of a pixel on its upper side is used as a prediction value of the current pixel.
- e) In the pixels in the Group 2, except for a $(kN+2)^{th}$ pixel (N is preferably 5, and k=1, 2), for other pixel, a reconstruction value of a pixel on its left side is used as a prediction value of the current pixel.
- f) In some examples, in the pixels in the Group 1, except for a $(kN+2)^{th}$ pixel (N is preferably 5, and k=1, 2), for other pixel, a mean (for example, $(P0+P1+1)>>1$, shift right by one bit, that is, divided by 2) of a reconstruction value of a pixel on its upper side (a reconstruction value of adjacent other block on its upper side, denoted as P0) and a reconstruction value of a pixel on its lower side (a reconstruction value in the Group 2, denoted as P1) is used as a prediction value of the current pixel.

Figure 14:
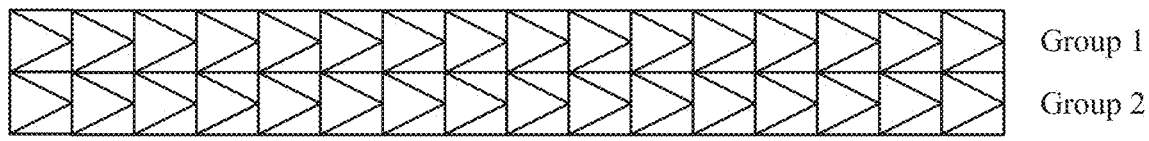
FIG. 14 is a second schematic diagram showing a prediction division mode of a current image block of 16×2.

2) A prediction division mode of the current image block of 16×2 is shown in FIG. 14, where the current image block includes Groups 1-2. Specifically, the Group 1 is composed of pixels in a first row, and horizontal prediction is applied in the Group 1; Group 2 is composed of pixels in a second row, and horizontal prediction is applied in the Group 2.

Figure 15A:
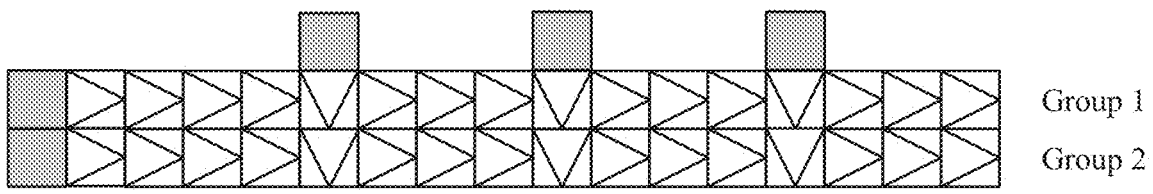

In order to improve parallelism in a prediction process, in the example shown in FIG. 11 applied to the examples of the present application, the prediction division mode of the current image block of 16×2 may be shown in FIG. 15A to FIG. 15D. The prediction division mode of the current image block shown in FIG. 15A to FIG. 15D is the same as that in FIG. 14, but their prediction modes are different. Specifically:

In solution 1, as shown in FIG. 15A, the prediction mode includes:
- a) For a $(kN+1)^{th}$ pixel (N is preferably 4, and k=1, 2, 3) in the Group 1 and the Group 2, a reconstruction value of a pixel on its upper side is used as a prediction value of the current pixel.
- b) For other pixel in the Group 1 and the Group 2, a reconstruction value of a pixel on its left side is used as a prediction value of the current pixel.

Figure 15B:
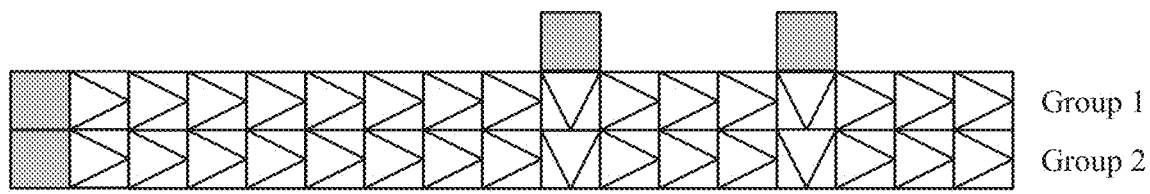

In solution 2, as shown in FIG. 15B, the prediction mode includes:
For a $(kN+1)^{th}$ pixel (N is preferably 4, and k=2, 3) in the Group 1 and the Group 2, a reconstruction value of a pixel on its upper side is used as a prediction value of the current pixel. For other pixel, a reconstruction value of a pixel on its left side is used as a prediction value of the current pixel.

Figure 15C:
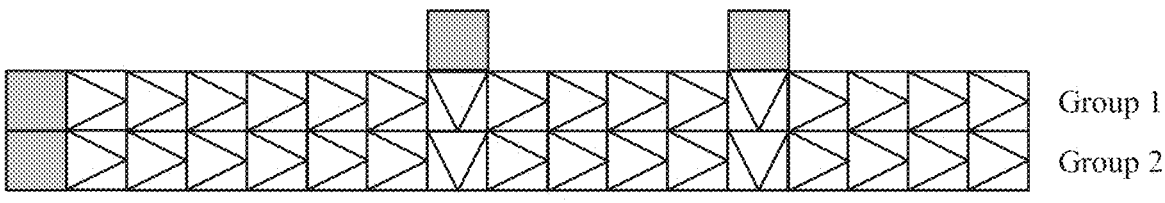

In solution 3, as shown in FIG. 15C, the prediction mode includes:
For a $(kN+2)^{th}$ pixel (N is preferably 5, and k=1, 2) in the Group 1 and the Group 2, a reconstruction value of a pixel on its upper side is used as a prediction value of the current pixel. For other pixel, a reconstruction value of a pixel on its left side is used as a prediction value of the current pixel.

In solution 4, as shown in FIG. 15D, the prediction mode includes:
For a $(kN+1)^{th}$ pixel (N is preferably 8, and k=1) in the Group 1 and the Group 2, a reconstruction value of a pixel on its upper side is used as a prediction value of the current pixel. For other pixels, a reconstruction value of a pixel on its left side is used as a prediction value of the current pixel.

In Examples 1-2, N and k may take other values. In addition, when a number of a plurality of consecutive pixels in a prediction group varies, values of N and k may also vary accordingly.

The reconstruction value of the current image block around the current image block of pixels marked by black shades in FIGS. 13A-13B and FIGS. 15A-15D may be set to be a default value if not available.

The current image block of 8×2 may be specifically a luminance block of 8×2, or a chrominance block of 8×2.

A grouping prediction mode of the current image block of 8×2 is shown in FIG. 16A and FIG. 16B. For any one current image block of 8×2, reference may be made to reconstruction values of pixels in 1 column on its left side (2 pixels) and in 1 row on its upper side (8 pixels).

As shown in FIG. 16A, in prediction division mode A, for all pixels, a reconstruction value of a pixel on their upper side is used as a prediction value of a current pixel.

As shown in FIG. 16B, in prediction division mode B, for all pixels, a reconstruction value of a pixel on their left side is used as a prediction value of a current pixel.

In order to improve parallelism in a prediction process, in the example shown in FIG. 11 applied to the examples of the present application, the prediction division mode of the current image block of 8×2 is shown in FIG. 17.

In FIG. 17, for a $(kN+1)^{th}$ pixel (N is preferably 4, and k=1) in the Group 1 and the Group 2, a reconstruction value of a pixel on its upper side is used as a prediction value of the current pixel. For other pixels, a reconstruction value of a pixel on its left side is used as a prediction value of the current pixel.

The current image block of 8×1 may be specifically a luminance block of 8×1, or a chrominance block of 8×1.

A grouping prediction mode of the current image block of 8×1 is shown in FIG. 18A and FIG. 18B. For any one current image block of 8×1, reference may be made to reconstruction values of pixels in one column on its left side (1 pixel) and in one row on its upper side (8 pixels). Then: as shown in FIG. 18A, in the prediction division mode A, for all pixels, a reconstruction value of a pixel on their upper side is used as a prediction value of a current pixel; as shown in FIG. 18B, in the prediction division mode B, for all pixels, a reconstruction value of a pixel on their left side is used as a prediction value of a current pixel.

In FIG. 18A and FIG. 18B, the current image block of 8×1 is divided into one prediction group.

In order to improve parallelism in a prediction process, in the example shown in FIG. 11 applied to the examples of the present application, the prediction division mode of the current image block of 8×2 is shown in FIG. 19.

In FIG. 19, for a $(kN+1)^{th}$ pixel (N is preferably 4, and k=1) in the current image block of 8×1, a reconstruction value of a pixel on its upper side is used as a prediction value of the current pixel. For other pixel, a reconstruction value of a pixel on its left side is used as a prediction value of the current pixel.

In an example, in any one of the above solutions, if the current image block is located in a first column of a frame image or an independent coding (decoding) unit, there is no pixel on a left side of the current image block, and in this case, a default value may be used to replace a reconstruction value. For example, the default value may be 1>>(bit depth-1).

Similarly, for any one of the above solutions, if the current image block is located in a first row of an image or independent coding (decoding) unit, there is no pixel on an upper side of the current image block, and in this case, a default value may be used to replace a reconstruction value. For example, the default value may be 1<<(bit_depth-1). The bit_depth represents a bit width of the current image block, which may be, for example, 8, 9, 10, 12 or 16. 1<<(bit_depth-1) represents that 1 shifts left by bit_depth-1 bits.

A reconstruction value of a pixel in the present application may be considered as a pixel value of the pixel in a component. For example, the component herein may be a red (R) component, a green (G) component, or a blue (B) component in an RGB format; or be a luminance (Y) component, a chrominance blue (Cb) component, or a chrominance red (Cr) component in a YCbCr format. A size of each component may be equal to or smaller than an image size. For example, in a YUV420 format, a size of Y is equal to the image size, and a width and a height of U or V are only half of that of Y, that is, a size thereof is only ¼ of the image size. Based on this, the bit depth herein may represent a bit width of the current image block in a component.

In any one of the above solutions, for each Group, except the horizontal or vertical prediction mode, other prediction modes may be used. A feasible prediction mode is: to perform reference prediction by using pixel values of an adjacent image block or an adjacent independent image block.

Embodiment 5

In some examples of the present application, a coding side may group a residual block of a coding unit. Specifically, each row of pixels in the coding unit are used as one prediction group, and a residual block in the prediction group is divided into at least one residual sub-block.

In division mode 1, a residual block in one prediction group is divided into one residual sub-block, which is equivalent to not grouping the residual block, as shown in a of FIG. 20.

In division mode 2, a residual block in one prediction group is divided into a plurality of residual sub-blocks. Specifically, according to a predetermined ratio, a residual block in one prediction group is divided into a plurality of residual sub-blocks. The predetermined ratio is not limited in the present application. Sizes of the plurality of residual sub-blocks may be equal, or sizes of some residual sub-blocks may be equal.

For example, according to a ratio of 1:1, a residual block in one prediction group is divided into 2 residual sub-blocks, as shown in b in FIG. 20.

For example, according to a ratio of 2:1:1, a residual block in one prediction group is divided into 3 residual sub-blocks, as shown in c in FIG. 20.

For example, according to a ratio of 1:1:2, a residual block in one prediction group is divided into 3 residual sub-blocks, as shown in d in FIG. 20.

For example, according to a ratio of 1:1:1:1, a residual block in one prediction group is divided into 4 residual sub-blocks, as shown in e in FIG. 20.

Where a-e in FIG. 20 are described by taking an example in which a coding unit is 16×2 and each row is used as one prediction group. The 16×2 coding unit may be a luminance block or a chrominance block. Each small square in each figure represents one pixel, and same small squares (for example, all white small squares, or all small squares marked by same shades) represent pixels in a same residual sub-block.

In addition, for a prediction group of 8×1, a residual block in the prediction group may be divided into one residual sub-block or be evenly divided into 2 residual sub-blocks. Of course, the specific implementation is not limited thereto.

In an example, coefficient coding manners of pixels in a same residual sub-block are same, or coding lengths of pixels in a same residual sub-block, that is, numbers of bits occupied after residual coefficients are coded, are same.

In an example, FIG. 20 shows 5 division modes of a residual block.

In an example, 1 bit or 3 bits may be used to represent division mode GPM (Geometric partitioning mode) (as shown in Table 4). GP0-GP4 may respectively correspond to a-e in FIG. 20.

TABLE 4

| GPM index coding method (conventional binary coding method) | | | | | |
|---|---|---|---|---|---|
| GPM | GP0 | GP1 | GP2 | GP3 | GP4 |
| Coding bit | 0 | 100 | 101 | 110 | 111 |

A method of coding an index of a residual block division mode shown in Table 4 may also be applicable to a residual block division mode of a prediction group of other size, as well as other division modes of the prediction group.

When a number of residual sub-blocks into which one residual block is divided is larger, information on a division mode that needs to be coded is more; and when a number of residual sub-blocks into which one residual block is divided is smaller, residuals with different characteristics are classified into one group, leading to lower coding efficiency of residual coefficients. Considering at least the two aspects, the examples of the present application provide the above residual block division method.

Embodiment 6

Figure 21:
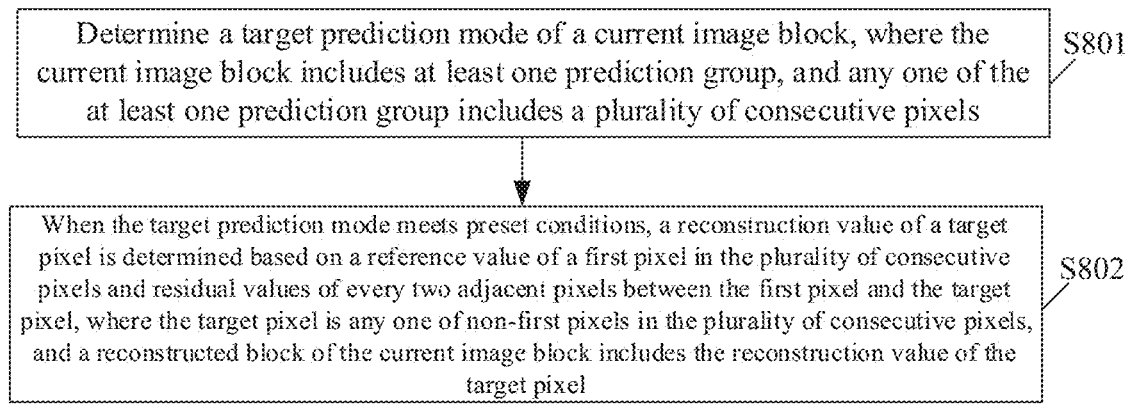
FIG. 21 is a second schematic diagram showing an image reconstruction method according to an example of the present application.

FIG. 21 is a schematic diagram showing an image reconstruction method according to an example of the present application, which may be applied to an image coding method or an image decoding method. The method shown in FIG. 21 may include the following steps.

At S801, a target prediction mode of a current image block is determined, where the current image block includes at least one prediction group, and any one of the at least one prediction group includes a plurality of consecutive pixels. The plurality of consecutive pixels may be a plurality of consecutive pixels in a row, or a plurality of consecutive pixels in a column.

When this example is applied to the image coding method, an execution subject of the example may be a coding side, and the current image block is specifically a to-be-coded image block or a to-be-coded unit.

When this example is applied to the image decoding method, an execution subject of the example may be a decoding side, and the current image block may be specifically a to-be-decoded image block or a to-be-decoded unit. S801 may include: parsing a code stream to obtain an index of the target prediction mode of the current image block.

At S802, when the target prediction mode meets a predetermined condition, a reconstruction value of a target pixel is determined based on a reference value of a first pixel in the plurality of consecutive pixels and residual values of every two adjacent pixels between the first pixel and the target pixel. The target pixel is any one of non-first pixels in the plurality of consecutive pixels, and a reconstructed block of the current image block includes the reconstruction value of the target pixel.

In an example, a first prediction manner is used for the first pixel in the plurality of consecutive pixels, and a second prediction manner is used for a non-first pixel. The target prediction mode includes the first prediction manner and the second prediction manner. In this case, the predetermined condition that the target prediction mode meets includes any one of the following conditions:

Condition 1: Both the first prediction manner and the second prediction manner are horizontal prediction.

Condition 2: Both the first prediction manner and the second prediction manner are vertical prediction.

Condition 3: One of the first prediction manner and the second prediction manner is horizontal prediction, and the other is vertical prediction. For example, the first prediction manner is horizontal prediction, and the second prediction manner is vertical prediction. For another example, the first prediction manner is vertical prediction, and the second prediction manner is horizontal prediction.

Condition 4: The first prediction manner is a manner in which reference prediction is performed by using a pixel value of an image block adjacent to the current image block or using a pixel value of an independent coding (decoding) unit adjacent to an independent coding (decoding) unit in which the current image block is located. The second prediction mode is horizontal prediction or vertical prediction.

According to the image reconstruction method provided in this example, the coding side/the decoding side, when performing reconstruction, may obtain a reconstruction value of a current pixel directly based on residual values of its previous pixel and its adjacent pixel, without waiting to obtain a reconstruction value of its previous pixel. This solution can greatly improve parallelism in a reconstruction process, and thereby improving decoding parallelism and throughput.

Figure 22:
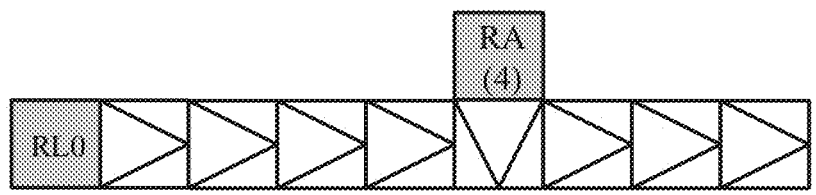
FIG. 22 is a schematic diagram showing a prediction mode of an image block of 8×1 shown in FIG. 21 according to an example of the present application.

For simplicity, a prediction mode of an image block of 8×1 shown in FIG. 22 will be taken as an example for description hereinafter. Other image block or other prediction mode may be easily inferred, which will not be described herein again.

A reconstruction value of a current image block of 8×1 is R (i), a residual value is Res (i), and a prediction value is Pred (i), where i=0, 1, 7. A reconstruction value of a block of 8×1 on an upper side of the current block of 8×1 is RA (i), where i=0, 1, 7, and a reconstruction value of a pixel on a left side is RLi, where i=0, 1, as shown in FIG. 22. FIG. 22 is drawn on the basis of FIG. 19.

Based on a conventional method, the prediction value of the image block of 8×1 is:
if i=0, then Pred (i)=RL0;
if i=1, 2 or 3, then Pred (i)=R (i−1);
if i=4, then Pred (i)=RA (4);
if i=5, 6 or 7, then Pred (i)=R (i−1).

In conclusion, in the conventional method, the reconstruction value of the image block of 8×1 is:

$$R(i) = Pred(i) + Res(i) == R(i-1)/RA(4) + Res(i), \text{ where } i = 0, 1, \ldots 7.$$

Based on the method shown in FIG. 21:

for $i = 0$, $R(0) = Pred(0) + Res(0) = RL0 + Res(0)$;

for $i = 1$, $R(1) = Pred(1) + Res(1)$, and since $pred(1) = R(0)$, $R(1) = R(0) + Res(1) = RL0 + Res(0 + Res(1)$.

Similarity, for $i = 2$ or 3, $R(2) = RL0 + Res(0) + Res(1) + Res(2)$, $$R(3) = RL0 + Res(0) + Res(1) + Res(2) + Res(3).$$

In conclusion, for any value of i=0~3, $$R(i) = RL0 + \sum_{k=0}^{i} Res(k).$$

Based on this method, for a reconstruction value of a pixel where i=1, 2 or 3, there is no need to wait for a reconstruction value of a pixel on its left side to be generated, and a reconstruction value of a current pixel can be directly acquired by obtaining only a pixel value RL0 on a left side of a current image block and residual values of the current pixel and a pixel on its left side. This solution can greatly improve decoding parallelism and throughput.

By analogy, for i=4~7, $$R(i) = RA(4) + \sum_{k=4}^{i} Res(k).$$

A reconstruction value of a pixel where i=5-7 can be acquired without waiting for a reconstruction value of a pixel on its left side.

Some or all technical features in any one of provided examples may be combined without conflict, so as to constitute anew example. In addition, the technical solution provided in any one of the above examples may be applicable to image blocks of 16×2, 8×2 and 8×1, or be applied to other image block of M×N, for example, 4×2 or 16×4.

In order to implement the functions in the above examples, the coding side/the decoding side includes corresponding hardware structures and/or software modules for performing the functions. Those skilled in the art should easily appreciate that, in combination with exemplary units and method steps described in the examples disclosed in the present application, the present application can be implemented in a form of hardware or a combination of hardware and computer software. Whether a function is performed by hardware or in a manner of driving hardware by computer software depends on specific application scenarios and design constraint conditions of a technical solution.

A decoding apparatus and a coding unit provided in the examples of the present application will be described below. In an example, any decoding apparatus provided below may be a target device 12 or a decoder 122 in FIG. 2, or be a decoder 30 in FIG. 6. In another example, any coding apparatus provided below may be a source device 11 or a coder 112 in FIG. 2, or be a coder 20 in FIG. 3. The description is unified herein, which will not be described below again.

Figure 23:
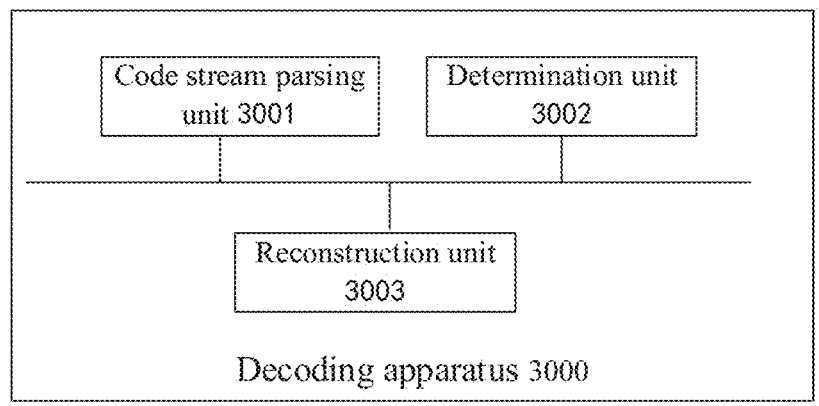
FIGS. 23-28 are structural schematic diagrams showing coding apparatuses or decoding apparatuses according to examples of the present application.

FIG. 23 is a structural schematic diagram showing a decoding apparatus 3000 according to the present application. Any one of the above decoding method examples can be executed by the decoding apparatus. The decoding apparatus 3000 includes a code stream parsing unit 3001, a determination unit 3002, and a reconstruction unit 3003. The code stream parsing unit 3001 is configured to parse a code stream to obtain a first syntax element, where the first syntax element includes an index of a target prediction mode of a to-be-decoded unit. The determination unit 3002 is configured to determine the target prediction mode from an index table based on the index of the target prediction mode. The index table includes correspondences between indexes of multiple prediction modes and the multiple prediction modes. The reconstruction unit 3003 is configured to reconstruct the to-be-decoded unit based on at least the target prediction mode to obtain a reconstructed block.

In an example, the code stream parsing unit 3001 may be implemented by the code stream parsing unit 301 in FIG. 6. The determination unit 3002 may be implemented by the prediction processing unit 304 in FIG. 6. The reconstruction unit 3003 may be jointly implemented by the prediction processing unit 304 in FIG. 6 in combination with the reconstruction unit 305. The current image block in FIG. 6 may be the to-be-decoded unit in this example. For more detailed description of the code stream parsing unit 3001, the determination unit 3002, and the reconstruction unit 3003, more detailed description of technical features, description of beneficial effects, and the like, reference may be made to corresponding method example parts, which will not be described herein again.

Figure 24:
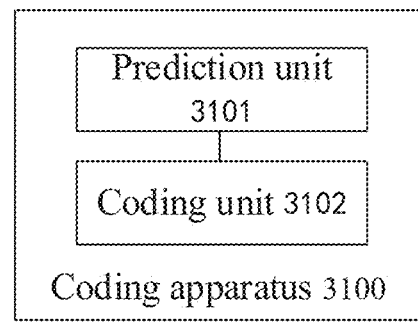

FIG. 24 is a structural schematic diagram showing a coding apparatus 3100 according to the present application. The coding apparatus 3100 includes a prediction unit 3101 and a coding unit 3102. The prediction unit 3101 is configured to determine a target prediction mode of a to-be-coded unit, and determine an index of the target prediction mode from an index table based on the target prediction mode. The index table includes correspondences between indexes of multiple prediction modes and the multiple prediction modes. The coding unit 3102 is configured to code the index of the target prediction mode into a code stream.

In an example, the prediction unit 3101 may be implemented by the prediction processing unit 201 in FIG. 3, and the coding unit 3102 may be implemented by the coefficient coding unit 205 in FIG. 3. The current image block in FIG. 3 may be the coding unit in this example. For more detailed description of the prediction unit 3101 and the coding unit 3102, more detailed description of technical features, description of beneficial effects, and the like, reference may be made to corresponding method example parts, which will not be described herein again.

Figure 25:
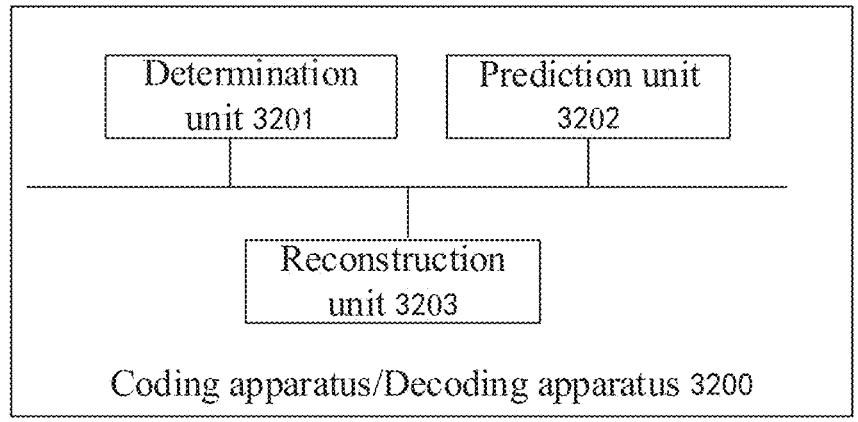

FIG. 25 is a structural schematic diagram showing a coding apparatus/a decoding apparatus 3200 according to the present application. The coding apparatus/the decoding apparatus 3200 includes a determination unit 3201, a prediction unit 3202, and a reconstruction unit 3203. The determination unit 3201 is configured to determine a residual coding mode of a current image block. If the residual coding mode is a skip residual coding mode, the prediction unit 3202 is configured to predict the current image block to obtain a predicted block; and the reconstruction unit 3203 is configured to determine the predicted block as a reconstructed block of the current image block. If the residual coding mode is a normal residual coding mode, the determination unit 3201 is further configured to acquire a residual quantization related value of the current image block to obtain a residual block; and the reconstructing unit 3203 is configured to reconstruct the current image block based on the residual block to obtain a reconstructed block of the current image block.

In an example, the determination unit 3201 may be implemented by the code stream parsing unit 301 in FIG. 6, the prediction unit 3202 may be implemented by the prediction processing unit 304 in FIG. 6, and the reconstruction unit 3203 may be implemented by the reconstruction unit 305 in FIG. 6. In another example, the determination unit 3201 may be implemented by the residual coding unit 203 in FIG. 3, the prediction unit 3202 may be implemented by the prediction processing unit 201 in FIG. 3, and the reconstruction unit 3203 may be implemented by the reconstruction unit 208 in FIG. 3. For more detailed description of the determination unit 3201, the prediction unit 3202, and the reconstruction unit 3203, and more detailed description of technical features, description of beneficial effects, and the like, reference may be made to corresponding method example parts, which will not be described herein again.

Figure 26:
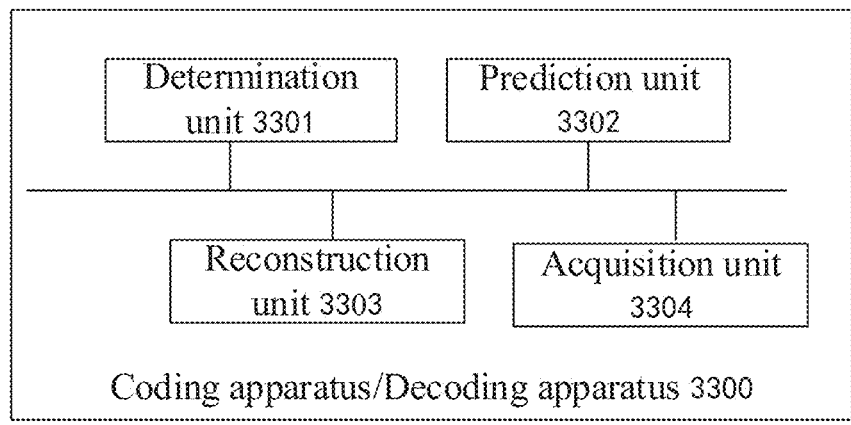

FIG. 26 is a structural schematic diagram showing a coding apparatus/a decoding apparatus 3300 according to the present application. The coding apparatus/the decoding apparatus 3300 includes a determination unit 3301, a prediction unit 3302, a reconstruction unit 3303, and an acquisition unit 3304. The determination unit 3301 is configured to determine a target prediction mode of a current image block. If the target prediction mode is a prediction mode based on skip residual coding, the prediction unit 3302 is configured to perform prediction on the current image block to obtain a predicted block; and the reconstruction unit 3303 is configured to determine the predicted block as a reconstructed block. If the target prediction mode is a prediction mode based on normal residual coding, the acquisition unit 3304 is configured to acquire a residual quantization related value of the current image block to obtain a residual block of the current image block; and the reconstruction unit 3303 is configured to reconstruct the current image block based on the target prediction mode and the residual block to obtain a reconstructed block.

In an example, the determination unit 3301 may be implemented by the code stream parsing unit 301 in FIG. 6, the prediction unit 3302 may be implemented by the prediction processing unit 304 in FIG. 6, the reconstruction unit 3303 may be implemented by the reconstruction unit 305 in FIG. 6, and the acquisition unit 3304 may be implemented by the code stream parsing unit 301 and the residual decoding unit 303 in FIG. 6. In another example, the determination unit 3301 and the prediction unit 3302 may be implemented by the prediction processing unit 201 in FIG. 3, the reconstruction unit 3303 may be implemented by the reconstruction unit 208 in FIG. 3, and the acquisition unit 3304 may be implemented by the residual decoding unit 303 in FIG. 3. For more detailed description of the determination unit 3301, the prediction unit 3302, the reconstruction unit 3303, and the acquisition unit 3304, and more detailed description of technical features, description of beneficial effects, and the like, reference may be made to corresponding method example parts, which will not be described herein again.

Figure 27:
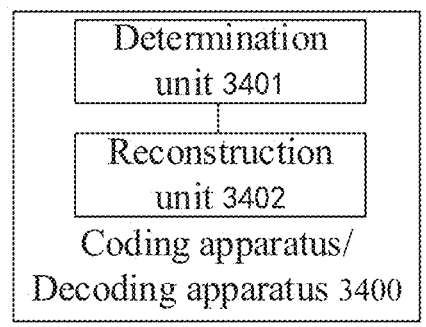

FIG. 27 is a structural schematic diagram showing a coding apparatus/a decoding apparatus 3400 according to the present application. The coding apparatus/the decoding apparatus 3400 includes a determination unit 3401 and a reconstruction unit 3402. The determination unit 3401 is configured to determine a prediction mode of at least one prediction group into which a current image block is divided. Any one of the at least one prediction group includes a plurality of consecutive pixels located in a same row/column; the any one prediction group includes a first specified pixel region and a second specified pixel region, where the first specified pixel region includes a plurality of pixel groups, the plurality of pixel groups are obtained by dividing according to the second specified pixel region, prediction manners of the first specified pixel region and the second specified pixel region are different, the plurality of pixel groups can be predicted in parallel, and the pixel groups each include one or more consecutive pixels. The reconstruction unit 3402 is configured to reconstruct the current image block based on the prediction mode of the at least one prediction group to obtain a reconstructed block.

In an example, the determination unit 3401 may be implemented by the code stream parsing unit 301 in FIG. 6, and the reconstruction unit 3402 may be jointly implemented by the prediction processing unit 304 and the reconstruction unit 305 in FIG. 6. In another example, the determination unit 3401 may be implemented by the prediction processing unit 201 in FIG. 3, and the reconstruction unit 3402 may be implemented by the reconstruction unit 208 in FIG. 3. For more detailed description of the determination unit 3401 and the reconstruction unit 3402, more detailed description of technical features, description of beneficial effects, and the like, reference may be made to corresponding method example parts, which will not be described herein again.

Figure 28:
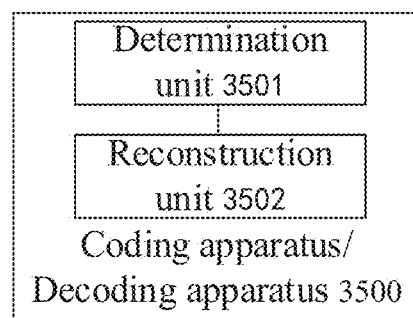

FIG. 28 is a structural schematic diagram showing a coding apparatus/a decoding apparatus 3500 according to the present application. The coding apparatus/the decoding apparatus 3500 includes a determination unit 3501 and a reconstruction unit 3502. The determination unit 3501 is configured to determine a target prediction mode of a current image block. The current image block includes at least one prediction group, and any one of the at least one prediction group includes a plurality of consecutive pixels. The reconstruction unit 3502 is configured to, when the target prediction mode meets a predetermined condition, determine a reconstruction value of a target pixel based on a reference value of a first pixel in the plurality of consecutive pixels and residual values of every two adjacent pixels between the first pixel and the target pixel. The target pixel is any non-first pixel in the plurality of consecutive pixels, and a reconstructed block of the current image block includes the reconstruction value of the target pixel.

In an example, the determination unit 3501 may be implemented by the code stream parsing unit 301 in FIG. 6, and the reconstruction unit 3502 may be jointly implemented by the prediction processing unit 304 and the reconstruction unit 305 in FIG. 6. In another example, the determination unit 3501 may be implemented by the prediction processing unit 201 in FIG. 3, and the reconstruction unit 3502 may be implemented by the reconstruction unit 208 in FIG. 3. For more detailed description of the determination unit 3501 and the reconstruction unit 3502, more detailed description of technical features, description of beneficial effects, and the like, reference may be made to corresponding method example parts, which will not be described herein again.

Figure 29:
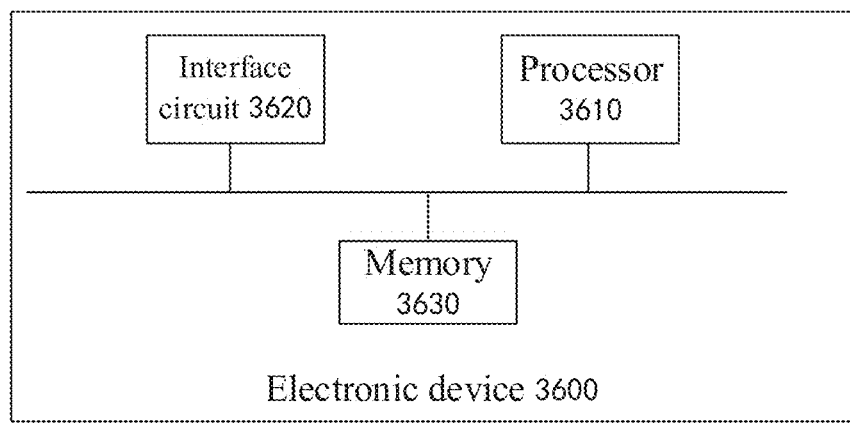
FIG. 29 is a structural schematic diagram showing an electronic device according to the present application.

The present application further provides an electronic device configured to perform any one of the above decoding method examples. FIG. 29 is a structural schematic diagram showing an electronic device according to the present application. The electronic device 3600 includes a processor 3610 and an interface circuit 3620. The processor 3610 and the interface circuit 3620 are coupled to each other. The interface circuit 3620 may be a transceiver or an input/output interface. In an example, the electronic device 3600 may further include a memory 3630 configured to store an instruction executed by the processor 3610, or store input data required for the processor 3610 to run the instruction, or store data generated after the processor 3610 runs the instruction.

The electronic device 3600 includes a processor 3610 and a communication interface 3620. The processor 3610 and the communication interface 3620 are coupled to each other. The communication interface 3620 may be a transceiver or an input/output interface. In an example, the electronic device 3600 may further include a memory 3630 configured to store an instruction executed by the processor 3610, or store input data required by the processor 3610 to run the instruction, or store data generated after the processor 3610 runs the instruction.

The specific connection media between the communication interface 3620, the processor 3610, and the memory 3630 are not limited in the examples of the present application. In the examples of the present application, the communication interface 3620, the processor 3610, and the memory 3630 are connected via a bus 3640 in FIG. 29, the bus is represented by a thick line in FIG. 29, and a connection manner between other components is merely schematically described and is not limited thereto. The bus may be divided into an address bus, a data bus, a control bus, and the like. For ease of representation, only one thick line is used in FIG. 29, but it does not mean that there is only one bus or one type of bus.

The memory 3630 may be configured to store software programs and modules, for example, program instructions/modules corresponding to the decoding method or the coding method provided in the examples of the present application, and the processor 3610 performs various functional applications and data processing by executing the software programs and the modules stored in the memory 3630, so as to implement any one of the decoding methods or the coding methods provided above. The communication interface 3620 may be configured to communicate signaling or data with other devices. In the present application, the electronic device 3600 may have a plurality of communication interfaces 3620.

The processor in the examples of the present application may be a central processing unit (CPU), a neural processing unit (NPU), or a graphic processing unit (GPU), or other general-purpose processors, a digital signal processor (DSP), an application specific integrated circuit (ASIC), a field programmable gate array (FPGA), or other programmable logic device, a transistor logic device, a hardware component, or any combination thereof. The general-purpose processor may be a microprocessor or any standard processor.

The method steps in the examples of the present application may be implemented by hardware, or by a processor to execute software instructions. The software instructions may be composed of corresponding software modules, and the software modules may be stored in a random access memory (RAM), a flash memory, a read-only memory (ROM), a programmable ROM (PROM), an erasable PROM (EPROM), an electrically EPROM (EEPROM), a register, a hard disk, a removable hard disk, a CD-ROM, or any other form of storage medium known in the art. An exemplary storage medium is coupled to the processor to enable the processor to read information from the storage medium and write information into the storage medium. Of course, the storage medium may be a constituent part of the processor. The processor and the storage medium may be located in an ASIC. In addition, the ASIC may be located in a network device or a terminal device. Of course, the processor and the storage medium may exist in the network device or the terminal device as discrete components.

An example of the present application further provides a coding and decoding system, including a coding side and a decoding side, where the coding side may be configured to perform any one of the coding methods provided above, and the decoding side is configured to perform a corresponding decoding method.

The above examples may be implemented in whole or in part by software, hardware, firmware or any combination thereof. When implemented by the software, they may be implemented in the form of a computer program product in whole or in part. The computer program product includes one or more computer programs or instructions. When the computer programs or instructions are loaded and executed on a computer, procedures or functions according to the examples of the present application are performed in whole or in part. The computer may be a general-purpose computer, a special-purpose computer, a computer network, a network device, a user device or other programmable apparatuses. The computer programs or instructions may be stored in a computer readable storage medium, or be transmitted from a computer readable storage medium to another computer readable storage medium. For example, the computer programs or instructions may be transmitted from a website, computer, server or data center to another website, computer, server or data center either wirelessly or via wired connections. The computer readable storage medium may be any available medium that may be accessed by a computer or a data storage device such as a server and a data center integrated with one or more available media. The available medium may be a magnetic medium such as a floppy disk, a hard disk and a magnetic tape, an optical medium such as a digital video disc (DVD), a semiconductor medium such as a solid state disk (SSD).

In the examples of the present application, if there is no special description and logical conflict, terms and/or descriptions across different examples have consistency and may be mutually cited, and technical features in different examples may be combined to form a new example according to their internal logical relationships. In the present application, "at least one" means one or more, and "plurality of" and "multiple" means two or more. "And/or" describes an association relationship of an associated object, indicating that there may be three relationships, for example, A and/or B, which may indicate cases in which A exists alone, A and B exist simultaneously, and B exists alone, where A and B may be singular or plural. In the text description of the present application, a character "/" generally indicates that the associated objects have an "or" relationship; in the formulas of the present application, the character "/" indicates that the associated objects have a "division" relationship.

The numbers involved in the examples of the present application are merely used for distinguishing description, and are not intended to limit the scope of the examples of the present application. The serial number of each process does not mean an execution order, and the execution order of each process should be determined by its function and internal logic.

The invention claimed is:

1. An image decoding method, comprising:
   determining a prediction mode of at least one prediction group into which a current image block is divided, wherein any one of the at least one prediction group comprises a plurality of consecutive pixels located in a same row/column, the any one prediction group comprises a first specified pixel region and a second specified pixel region, the first specified pixel region comprises a plurality of separate pixel groups, the plurality of separate pixel groups are obtained by dividing according to the second specified pixel region, prediction manners of the first specified pixel region and the second specified pixel region are different, the plurality of separate pixel groups are predicted in parallel, and the separate pixel groups each comprise one or more consecutive pixels; and
   reconstructing the current image block based on the prediction mode of the at least one prediction group to obtain a reconstructed block.

2. The method according to claim 1, wherein
   in response to determining that the any one prediction group comprises a plurality of consecutive pixels located in a same row, vertical prediction is used in the first specified pixel region, and horizontal prediction or vertical mean prediction is used in the second specified pixel region; and/or,
   in response to determining that the any one prediction groups comprises a plurality of consecutive pixels located in a same column, horizontal prediction is used in the first specified pixel region, and vertical prediction or horizontal mean prediction is used in the second specified pixel region.

3. The method according to claim 1, wherein differences among numbers of pixels comprised in different pixel groups are equal to or less than a threshold.

4. The method according to claim 1, wherein in response to determining that there is no reference block for the current image block, a reconstruction value of the reference block for the current image block is 1 shifted left by bit_depth-1 bits, and the bit_depth represents a bit width of the current image block.

5. An electronic device, comprising: a processor and a memory, wherein the memory is configured to store computer instructions, and the processor is configured to call the computer instructions from the memory and run the computer instructions to implement operations, comprising:

determining a prediction mode of at least one prediction group into which a current image block is divided, wherein any one of the at least one prediction group comprises a plurality of consecutive pixels located in a same row/column, the any one prediction group comprises a first specified pixel region and a second specified pixel region, the first specified pixel region comprises a plurality of separate pixel groups, the plurality of separate pixel groups are obtained by dividing according to the second specified pixel region, prediction manners of the first specified pixel region and the second specified pixel region are different, the plurality of separate pixel groups are predicted in parallel, and the separate pixel groups each comprise one or more consecutive pixels; and reconstructing the current image block based on the prediction mode of the at least one prediction group to obtain a reconstructed block.

6. A non-transitory computer readable storage medium, wherein the storage medium stores computer programs or instructions, and the computer programs or instructions are executed by an electronic device to implement the method according to claim 1.

7. The method according to claim 2, wherein differences among numbers of pixels comprised in different pixel groups are equal to or less than a threshold.

8. The method according to claim 2, wherein in response to determining that there is no reference block for the current image block, a reconstruction value of the reference block for the current image block is 1 shifted left by bit_depth-1 bits, and the bit_depth represents a bit width of the current image block.

9. The method according to claim 1, wherein the current image block comprises at least one prediction group, and any one of the at least one prediction group comprises a plurality of consecutive pixels; and reconstructing the current image block based on the prediction mode of the at least one prediction group to obtain the reconstructed block comprises:

when a target prediction mode satisfies a predetermined condition, determining a reconstruction value of a target pixel based on a reference value of a first pixel in the plurality of consecutive pixels and residual values of every two adjacent pixels between the first pixel and the target pixel, wherein the target pixel is any one of non-first pixels in the plurality of consecutive pixels, and a reconstructed block of the current image block comprises the reconstruction value of the target pixel.

10. The method according to claim 2, wherein the current image block comprises at least one prediction group, and any one of the at least one prediction group comprises a plurality of consecutive pixels; and reconstructing the current image block based on the prediction mode of the at least one prediction group to obtain the reconstructed block comprises:

when a target prediction mode satisfies a predetermined condition, determining a reconstruction value of a target pixel based on a reference value of a first pixel in the plurality of consecutive pixels and residual values of every two adjacent pixels between the first pixel and the target pixel, wherein the target pixel is any one of non-first pixels in the plurality of consecutive pixels, and a reconstructed block of the current image block comprises the reconstruction value of the target pixel.

11. The electronic device according to claim 5, wherein in response to determining that the any one prediction group comprises a plurality of consecutive pixels located in a same row, vertical prediction is used in the first specified pixel region, and horizontal prediction or vertical mean prediction is used in the second specified pixel region; and/or, in response to determining that the any one prediction groups comprises a plurality of consecutive pixels located in a same column, horizontal prediction is used in the first specified pixel region, and vertical prediction or horizontal mean prediction is used in the second specified pixel region.

12. The electronic device according to claim 5, wherein differences among numbers of pixels comprised in different pixel groups are equal to or less than a threshold.

13. The electronic device according to claim 5, wherein in response to determining that there is no reference block for the current image block, a reconstruction value of the reference block for the current image block is 1 shifted left by bit_depth-1 bits, and the bit_depth represents a bit width of the current image block.

14. The electronic device according to claim 11, wherein differences among numbers of pixels comprised in different pixel groups are equal to or less than a threshold.

15. The electronic device according to claim 11, wherein in response to determining that there is no reference block for the current image block, a reconstruction value of the reference block for the current image block is 1 shifted left by bit_depth-1 bits, and the bit_depth represents a bit width of the current image block.

16. The electronic device according to claim 5, wherein the current image block comprises at least one prediction group, and any one of the at least one prediction group comprises a plurality of consecutive pixels; and reconstructing the current image block based on the prediction mode of the at least one prediction group to obtain the reconstructed block, comprises:

when the target prediction mode satisfies a predetermined condition, determining a reconstruction value of a target pixel based on a reference value of a first pixel in the plurality of consecutive pixels and residual values of every two adjacent pixels between the first pixel and the target pixel, wherein the target pixel is any one of non-first pixels in the plurality of consecutive pixels, and a reconstructed block of the current image block comprises the reconstruction value of the target pixel.

17. The electronic device according to claim 11, wherein the current image block comprises at least one prediction group, and any one of the at least one prediction group comprises a plurality of consecutive pixels; and reconstructing the current image block based on the prediction mode of the at least one prediction group to obtain the reconstructed block, comprises:

when the target prediction mode satisfies a predetermined condition, determining a reconstruction value of a target pixel based on a reference value of a first pixel in the plurality of consecutive pixels and residual values of every two adjacent pixels between the first pixel and the target pixel, wherein the target pixel is any one of non-first pixels in the plurality of consecutive pixels, and a reconstructed block of the current image block comprises the reconstruction value of the target pixel.

* * * * *